US006777132B2

(12) United States Patent
Barker et al.

(10) Patent No.: US 6,777,132 B2
(45) Date of Patent: Aug. 17, 2004

(54) ALKALI/TRANSITION METAL HALO— AND HYDROXY-PHOSPHATES AND RELATED ELECTRODE ACTIVE MATERIALS

(75) Inventors: Jeremy Barker, Shipton-under-Wychwood (GB); M. Yazid Saidi, Henderson, NV (US); Jeffrey L. Swoyer, Henderson, NV (US)

(73) Assignee: Valence Technology, Inc., Henderson, NV (US)

( * ) Notice: Subject to any disclaimer, the term of this patent is extended or adjusted under 35 U.S.C. 154(b) by 126 days.

(21) Appl. No.: 10/014,822

(22) Filed: Oct. 26, 2001

(65) Prior Publication Data

US 2003/0027049 A1 Feb. 6, 2003

Related U.S. Application Data

(63) Continuation-in-part of application No. 09/559,861, filed on Apr. 27, 2000, now Pat. No. 6,387,568.

(51) Int. Cl.$^7$ ................................................ H01M 4/58
(52) U.S. Cl. ............................... 429/231.1; 429/231.2; 429/231.3
(58) Field of Search ....................... 429/218.1, 231.1, 429/231.2, 231.3

(56) References Cited

U.S. PATENT DOCUMENTS

| | | |
|---|---|---|
| 3,736,184 A | 5/1973 | Dey et al. |
| 4,009,092 A | 2/1977 | Taylor |
| 4,049,891 A | 9/1977 | Hong et al. |
| 4,098,687 A | 7/1978 | Yang |
| 4,194,062 A | 3/1980 | Carides et al. |
| 4,260,668 A | 4/1981 | Lecerf et al. |
| 4,434,216 A | 2/1984 | Joshi et al. |
| 4,464,447 A | 8/1984 | Lazzari et al. |
| 4,477,541 A | 10/1984 | Fraioli |
| 4,512,905 A | 4/1985 | Clearfield et al. |
| 4,668,595 A | 5/1987 | Yoshino et al. |
| 4,683,181 A | 7/1987 | Armand et al. |
| 4,690,877 A | 9/1987 | Gabano et al. |
| 4,707,422 A | 11/1987 | de Neufville et al. |
| 4,792,504 A | 12/1988 | Schwab et al. |
| 4,803,137 A | 2/1989 | Miyazaki et al. |
| 4,830,939 A | 5/1989 | Lee et al. |
| 4,925,752 A | 5/1990 | Fauteux et al. |
| 4,935,317 A | 6/1990 | Fauteux et al. |
| 4,985,317 A | 1/1991 | Adachi et al. |
| 4,990,413 A | 2/1991 | Lee et al. |
| 5,011,501 A | 4/1991 | Shackle et al. |
| 5,028,500 A | 7/1991 | Fong et al. |
| 5,037,712 A | 8/1991 | Shackle et al. |
| 5,130,211 A | 7/1992 | Wilkinson et al. |
| 5,232,794 A | 8/1993 | Krumpelt et al. |
| 5,262,253 A | 11/1993 | Golovin |
| 5,262,548 A | 11/1993 | Barone |
| 5,296,436 A | 3/1994 | Bortinger |
| 5,300,373 A | 4/1994 | Shackle |
| 5,326,653 A | 7/1994 | Chang |
| 5,399,447 A | 3/1995 | Chaloner-Gill et al. |
| 5,411,820 A | 5/1995 | Chaloner-Gill |
| 5,418,090 A | 5/1995 | Koksbang et al. |
| 5,418,091 A | 5/1995 | Gozdz et al. |
| 5,435,054 A | 7/1995 | Tonder et al. |
| 5,456,000 A | 10/1995 | Gozdz et al. |
| 5,460,904 A | 10/1995 | Gozdz et al. |
| 5,463,179 A | 10/1995 | Chaloner-Gill et al. |
| 5,482,795 A | 1/1996 | Chaloner-Gill |
| 5,508,130 A | 4/1996 | Golovin |
| 5,514,490 A | 5/1996 | Chen et al. |
| 5,538,814 A | 7/1996 | Kamauchi et al. |

(List continued on next page.)

FOREIGN PATENT DOCUMENTS

| | | |
|---|---|---|
| EP | 0 680 106 A1 | 11/1995 |
| EP | 0 849 817 A3 | 6/1998 |
| EP | 1 049 182 A2 | 11/2000 |
| EP | 1 093 172 A1 | 4/2001 |
| JP | 61-263069 A1 | 11/1986 |
| JP | 06-251764 A1 | 9/1994 |
| JP | 09-171827 A1 | 6/1997 |
| JP | 2001 052733 A1 | 2/2001 |
| JP | 2001 085010 A1 | 3/2001 |
| WO | WO 98/12761 A1 | 3/1998 |
| WO | WO 99/30378 A1 | 6/1999 |
| WO | WO 00/01024 A1 | 1/2000 |
| WO | WO 00/31812 A1 | 6/2000 |
| WO | WO 00/57505 A1 | 9/2000 |
| WO | WO 01/13443 A2 | 2/2001 |
| WO | WO 01/53198 A1 | 7/2001 |
| WO | WO 01/54212 A1 | 7/2001 |
| WO | WO 01/84655 A1 | 11/2001 |
| WO | WO 02/44084 A1 | 6/2002 |
| WO | WO 02/097907 A2 | 12/2002 |

OTHER PUBLICATIONS http://www.webmineral.com/data/Griphite.shtml.*
Rinaldi, "The crystal structure of griphite, complex phosphate not a garnetoid", Bulletin de Mineralogie (1978) 101(5–6, 543–7.*

(List continued on next page.)

*Primary Examiner*—Carol Chaney
(74) *Attorney, Agent, or Firm*—Michael D. Ross; Roger A. Williams; Cynthia S. Kovacevic

(57) ABSTRACT

The present invention relates to novel electrode active materials represented by the general formula $A_a M_b (XY_4)_c Z_d$, wherein:

(a) A is one or more alkali metals, and $0 < a \leq 8$;

(b) M is at least one metal capable of undergoing oxidation to a higher valence state, and $1 \leq b \leq 3$;

(c) $XY_4$ is selected from the group consisting of $X'O_{4-x}Y'_x$, $X'O_{4-y}Y'_{2y}$, $X''S_4$, and a mixture thereof, where X' is P, As, Sb, Si, Ge, S, and mixtures thereof; X" is P, As, Sb, Si, Ge, and mixtures thereof, Y' is halogen, $0 \leq x < 3$, $0 < y < 4$, and $0 < c \leq 3$; and (d) Z is OH, a halogen, or mixtures thereof, and $0 < d \leq 6$.

149 Claims, No Drawings

U.S. PATENT DOCUMENTS

| | | | |
|---|---|---|---|
| 5,540,741 A | | 7/1996 | Gozdz et al. |
| 5,541,020 A | | 7/1996 | Golovin et al. |
| 5,620,810 A | | 4/1997 | Golovin et al. |
| 5,643,695 A | | 7/1997 | Barker et al. |
| 5,660,948 A | | 8/1997 | Barker |
| 5,695,893 A | | 12/1997 | Arai et al. |
| 5,700,298 A | | 12/1997 | Shi et al. |
| 5,712,059 A | | 1/1998 | Barker et al. |
| 5,721,070 A | * | 2/1998 | Shackle ............... 429/220 |
| 5,804,335 A | | 9/1998 | Komauchi |
| 5,830,602 A | | 11/1998 | Barker et al. |
| 5,851,504 A | | 12/1998 | Barker et al. |
| 5,869,207 A | | 2/1999 | Saidi et al. |
| 5,871,866 A | | 2/1999 | Barker et al. |
| 5,910,382 A | | 6/1999 | Goodenough et al. |
| 6,004,697 A | | 12/1999 | Thackeray et al. |
| 6,020,087 A | | 2/2000 | Gao |
| 6,103,419 A | | 8/2000 | Saidi et al. |
| 6,136,472 A | | 10/2000 | Barker et al. |
| 6,153,333 A | | 11/2000 | Barker |
| 6,183,718 B1 | | 2/2001 | Barker et al. |
| 6,306,215 B1 | | 10/2001 | Larkin |
| 6,387,568 B1 | | 5/2002 | Barker et al. |
| 6,514,640 B1 | | 2/2003 | Armand et al. |
| 2001/0055718 A1 | | 12/2001 | Li et al. |

OTHER PUBLICATIONS

Andersson, A., et al., "Thermal Stability of $LiFePO_4$–Based Cathodes" Electrochemical and Solid State Matters, vol. 3(2), pp. 66–68 (2000).

Amine, K., et al., "Olivine $LiCoPO_4$ as 4.8 V Electrode Material For Lithium Batteries" Electrochemical and Solid–State Letters, vol. 3(4), pp. 178–179 (2000).

Kirby, et al., "Crystal Structure of Potassium Aluminum Fluoride Phosphate $KAlFPO_4$" Zeits. Kristall., p. 956 (1995).

Nagornyi, et al., "Preparation and Structure of the New Fluoride Phosphate $Na_5CrF_2(PO_4)_2$" Russ. J. Inorg. Chem., vol. 35, p. 470 (1990).

Arlt, et al., "$Na_5AlF_2(PO_4)_2$: Darstellung, Kristallstruktur und Lonenleitfahigkeit" Z. Anorg. Allg. Chem., vol. 179, p. 547 (1987).

www.webmineral.com/data/Amblygonite.shtml.
www.webmineral.com/data/Lacroixite.shtml.
www.webmineral.com/data/Montebrasite.shtml.
www.webmineral.com/data/Travorite.shtml.

International Search Report for PCT/US97/1544.

Rangan, K, et al., "New Titanium–Vanadium Phosphates of Nasicon and Langbeinite Structures, and Differences Between the Two Structures Toward Deintercalation of Alkali Metal" Journal of Solid State Chemistry, vol. 109, pp. 116–121 (1994).

Delmas, C., et al., "The Nasicon–Type Titanium Phosphates $ATi_2(PO_4)_3$ (A=Li, Na) as Electrode Materials" Solid State Ionics, vol. 28–30, pp. 419–423 (1988).

Hagenmuller, P., et al., "Intercalation in 3D–Skeleton Structures: Ionic and Electronic Features" Mat. Res. Soc. Symp. Proc., vol. 210, pp. 232–334 (1991).

Chem. Abstrs. Svs., XP 2048304 (1997).

Padhi et al., "Lithium Intercalation into NASICON–Type Mixed Phosphates: . . . and $Li_2FeTi(PO_4)_3$" $37^{th}$ Power Sources Conference, Cherry Hill, New Jersey, Conference Dates: Jun. 17–20, 1996; published Oct. 15, 1996.

Sisler, H., et al., "Chemistry: A Systematic Approach" Oxford University Press, p. 746 (1980).

Gopalakrishnan, J., et al., "$V_2PO_4$:A Novel NASICON–Type Vanadium Phosphate Synthesized by Oxidative Deintercalation of odium from $Na_3V_2PO_4$" Chemistry of Materials, vol. 4(4), pp. 745–747(1992).

Delmas, C., "The Chemical Short Circuit Method. An Improvement in the Intercalation–Deintercalation Techniques" Mat. Res. Bull., vol. 23, pp. 65–72 (1988).

Ivanov–Schitz, A., et al., "Electrical and Interfacial Properties of a $Li_3Fe_2(PO_4)_3$ Single Crystal with Silver Electrodes" Solid State Ionics, vol. 91, pp. 93–99 (1996).

Cretin, M., et al., "Study of $Li_{1+x}Al_xTi_{2-x}(PO_4)_3$ for $Li^+$ Potentiometric Sensors" Journal of the European Ceramic Society, vol. 15, pp. 1149–1156 (1995).

Chem. Abstrs. Svs., XP 2048305 (1995).

Patent Abstracts of Japan, vol. 94, No. 64 (1994) (Abstract for JP 06–251764).

Okada, S., et al., "$Fe_2(SO_4)_3$ as a Cathode Material for Rechargeable Lithium Batteries" (Date and name of publication unknown).

Adachi, G., et al., "Lithium–ion Conductive Solid Electrolyte" Chemical Abstracts 112 129692 (1981).

Delmas, C., et al., "A Nasicon–type Phase as Intercalation Electrode: Sodium Titanium Phosphate ($NaTi_2(PO_4)_3$)" Mater. Res. Bull., vol. 22(5) pp. 631–9 (1987).

Nanjundaswamy, K.S., et al., "Synthesis, Redox Potential Evaluation and Electrochemical Characteristics of NASICON–Related–3D Framework Compounds" Solid State Ionics, vol. 92, pp. 1–10 (1996).

Nadiri, A., et al., "Lithium Intercalation in Lithium Titanium Phosphate ($LiTi_2(PO_4)_3$)" C. R. Acad. Sci., ser. 2, vol. 304(9), pp. 415–418 (1987) (Abstract Only).

Cotton et al., "Advanced Inorganic Chemistry: A Comprehensive Text" Interscience Publishers, $3^{rd}$ Edition, pp. 864–868.

Linden, D., "Handbook of Batteries" McGraw Hill, $2^{nd}$ Edition, pp. 36.4–36.9.

Bykov et al., Superionic Conductors $Li_3M_2(PO_4)_3$ (M=Fe, Sc, Cr): Synthesis and Electrophysical Properties Solid State Ionics, vol. 138, pp. 31–52 (1990).

Genkina, et al., "Crystal Structure of Synthetic Tavorite $LiFe[PO_4](OH,F)$" Kristallografiya, vol. 29(1), pp. 50–55 (1984).

Genkina, et al., "Phase Formation and Crystallochemistry of Phosphates" Izv. Akad.

Dutreilh, et al., "Synthesis and Crystal Structure of a New Lithium Nickel Fluorophosphates $Li_2[NiF(PO_4)]$. . . " Journal of Solid State Chemistry, vol. 142, pp. 1–5 (1999).

M–T Averbuch–Pouchot, et al., "Topics in Phosphate Chemistry" World Scientific Publishing Co., Singapore, pp. 106–119 (1996).

Loiseau, et al., "$NH_4FePO_4F$: Structural Study and Magnetic Properties" Journal of Solid State Chemistry III, pp. 390–396 (1994).

LeMeins, et al., "Phase Transitions in the $Na_3M_2(PO4)F_3$ Family (M=$Al^{3+}$, $V^{3+}$, $Cr^{3+}$, $Fe^{3+}$, $Ga^{3+}$): Synthesis, thermal and Structural, and Magnetic Studies" Journal of Solid State Chemistry, vol. 148, pp. 260–277 (1999).

Moss, et al., "On the X–Ray Identification of Amblygonite and Montebrasite" Mineralogical Magazine, vol. 37, No. 287, pp. 414–422 (1969).

Padhi, A.K., et al., "Phospho–olivines as Positive–Electrode Materials for Rechargeable Lithium Batteries" J. Electrochem. Soc., vol. 144(4), pp. 1188–1194 (1997).

Yukabovich, et al., "The Mixed Anionic Framework in the Structure of $Na_2\{MnF[PO_4]\}$" Acta Crystallographia Section C; Crystal Structure Communications, vol. C53(4), pp. 395–397 (1997).

LeMeins, et al., "Ionic Conductivity of Crystalline and Amorphous $Na_3Al_2(PO_4)F_3$" Solid State Ionics Diffusion Reactions, vol. 111, pp. 67–75 (1998).

PCT International Search Report PCT/US01/08132 dated Sep. 27, 2001.

Reddy and Hossain, (Editor Linden), "Rechargeable Lithium Batteries (Ambient Temperature)" Handbood of Batteries, $3^{rd}$ Edition, pp. 34.1–34.62.

Rinaldi, "The Crystal Structure of Griphite, Complex Phosphate Not a Garnetoid" Bulletin de Mineralogie, 101(5–6), pp. 453–457 (1978).

International Search Report for PCT/US02/33510.

* cited by examiner

US 6,777,132 B2

ALKALI/TRANSITION METAL HALO— AND HYDROXY-PHOSPHATES AND RELATED ELECTRODE ACTIVE MATERIALS

This application is a continuation-in-part of U.S. patent application Ser. No. 09/559,861, filed Apr. 27, 2000 now U.S. Pat. No. 6,387,568.

FIELD OF THE INVENTION

This invention relates to electrode active materials, electrodes, and batteries. In particular, this invention relates to active materials comprising lithium or other alkali metals, transition metals, phosphates or similar moieties, and halogen or hydroxyl moieties.

BACKGROUND OF THE INVENTION

A wide variety of electrochemical cells, or "batteries," are known in the art. In general, batteries are devices that convert chemical energy into electrical energy, by means of an electrochemical oxidation-reduction reaction. Batteries are used in a wide variety of applications, particularly as a power source for devices that cannot practicably be powered by centralized power generation sources (e.g., by commercial power plants using utility transmission lines).

Batteries can be generally described as comprising three components: an anode, that contains a material that is oxidized (yields electrons) during discharge of the battery (i.e., while it is providing power); a cathode that contains a material that is reduced (accepts electrons) during discharge of the battery; and an electrolyte that provides for transfer of ions between the cathode and anode. During discharge, the anode is the negative pole of the battery, and the cathode is the positive pole. Batteries can be more specifically characterized by the specific materials that make up each of these three components. Selection of these components can yield batteries having specific voltage and discharge characteristics that can be optimized for particular applications.

Batteries can also be generally categorized as being "primary," where the electrochemical reaction is essentially irreversible, so that the battery becomes unusable once discharged; and "secondary," where the electrochemical reaction is, at least in part, reversible so that the battery can be "recharged" and used more than once. Secondary batteries are increasingly used in many applications, because of their convenience (particularly in applications where replacing batteries can be difficult), reduced cost (by reducing the need for replacement), and environmental benefits (by reducing the waste from battery disposal).

There are a variety of secondary battery systems known in the art. Among the most common systems are lead-acid, nickel-cadmium, nickel-zinc, nickel-iron, silver oxide, nickel metal hydride, rechargeable zinc-manganese dioxide, zinc-bromide, metal-air, and lithium batteries. Systems containing lithium and sodium afford many potential benefits, because these metals are light in weight, while possessing high standard potentials. For a variety of reasons, lithium batteries are, in particular, commercially attractive because of their high energy density, higher cell voltages, and long shelf-life.

Lithium batteries are prepared from one or more lithium electrochemical cells containing electrochemically active (electroactive) materials. Among such batteries are those having metallic lithium anodes and metal chalcogenide (oxide) cathodes, typically referred to as "lithium metal" batteries. The electrolyte typically comprises a salt of lithium dissolved in one or more solvents, typically non-aqueous aprotic organic solvents. Other electrolytes are solid electrolytes (typically polymeric matrixes) that contain an ionic conductive medium (typically a lithium containing salt dissolved in organic solvents) in combination with a polymer that itself may be ionically conductive but electrically insulating.

Cells having a metallic lithium anode and metal chalcogenide cathode are charged in an initial condition. During discharge, lithium metal yields electrons to an external electrical circuit at the anode. Positively charged ions are created that pass through the electrolyte to the electrochemically active (electroactive) material of the cathode. The electrons from the anode pass through the external circuit, powering the device, and return to the cathode.

Another lithium battery uses an "insertion anode" rather than lithium metal, and is typically referred to as a "lithium ion" battery. Insertion or "intercalation" electrodes contain materials having a lattice structure into which an ion can be inserted and subsequently extracted. Rather than chemically altering the intercalation material, the ions slightly expand the internal lattice lengths of the compound without extensive bond breakage or atomic reorganization. Insertion anodes contain, for example, lithium metal chalcogenide, lithium metal oxide, or carbon materials such as coke and graphite. These negative electrodes are used with lithium-containing insertion cathodes. In their initial condition, the cells are not charged, since the anode does not contain a source of cations. Thus, before use, such cells must be charged in order to transfer cations (lithium) to the anode from the cathode. During discharge the lithium is then transferred from the anode back to the cathode. During subsequent recharge, the lithium is again transferred back to the anode where it reinserts. This back-and-forth transport of lithium ions ($Li^+$) between the anode and cathode during charge and discharge cycles had led to these cells as being called "rocking chair" batteries.

A variety of materials have been suggested for use as cathode active materials in lithium batteries. Such materials include, for example, $MoS_2$, $MnO_2$, $TiS_2$, $NbSe_3$, $LiCoO_2$, $LiNiO_2$, $LiMn_2O_4$, $V_6O_{13}$, $V_2O_5$, $SO_2$, $CuCl_2$. Transition metal oxides, such as those of the general formula $Li_xMO_y$, are among those materials preferred in such batteries having intercalation electrodes. Other materials include lithium transition metal phosphates, such as $LiFePO_4$, and $Li_3V(PO_4)_3$. Such materials having structures similar to olivine or NASICON materials are among those known in the art. Cathode active materials among those known in the art are disclosed in S. Hossain, "Rechargeable Lithium Batteries (Ambient Temperature)," *Handbook of Batteries*, 2d ed., Chapter 36, Mc-Graw Hill (1995); U.S. Pat. No. 4,194,062, Carides, et al., issued Mar. 18, 1980; U.S. Pat. No. 4,464,447, Lazzari, et al., issued Aug. 7, 1984; U.S. Pat. No. 5,028,500, Fong et al., issued Jul. 2, 1991; U.S. Pat. No. 5,130,211, Wilkinson, et al., issued Jul. 14, 1992; U.S. Pat. No. 5,418,090, Koksbang et al., issued May 23, 1995; U.S. Pat. No. 5,514,490, Chen et al., issued May 7, 1996; U.S. Pat. No. 5,538,814, Kamauchi et al., issued Jul. 23, 1996; U.S. Pat. No. 5,695,893, Arai, et al., issued Dec. 9, 1997; U.S. Pat. No. 5,804,335, Kamauchi, et al., issued Sep. 8, 1998; U.S. Pat. No. 5,871,866, Barker et al., issued Feb. 16, 1999; U.S. Pat. No. 5,910,382, Goodenough, et al., issued Jun. 8, 1999; PCT Publication WO/00/31812, Barker, et al., published Jun. 2, 2000; PCT Publication WO/00/57505, Barker, published Sep. 28, 2000; U.S. Pat. No. 6,136,472, Barker et al., issued Oct. 24, 2000; U.S. Pat. No. 6,153,333, Barker, issued Nov. 28, 2000; PCT Publication WO/01/13443, Barker, published Feb. 22, 2001; and PCT Publication WO/01/54212, Barker et al., published Jul. 26, 2001.

In general, such a cathode material must exhibit a high free energy of reaction with lithium, be able to intercalate a large quantity of lithium, maintain its lattice structure upon insertion and extraction of lithium, allow rapid diffusion of lithium, afford good electrical conductivity, not be significantly soluble in the electrolyte system of the battery, and be readily and economically produced. However, many of the cathode materials known in the art lack one or more of these characteristics. As a result, for example, many such materials are not economical to produce, afford insufficient voltage, have insufficient charge capacity, or lose their ability to be recharged over multiple cycles.

SUMMARY OF THE INVENTION

The invention provides electrode active materials comprising lithium or other alkali metals, a transition metal, a phosphate or similar moiety, and a halogen or hydroxyl moiety. Such electrode actives include those of the formula:

$$A_a M_b (XY_4)_c Z_d,$$

wherein
(a) A is selected from the group consisting of Li, Na, K, and mixtures thereof, and $0 < a \leq 8$;
(b) M comprises one or more metals, comprising at least one metal which is capable of undergoing oxidation to a higher valence state, and $1 \leq b \leq 3$;
(c) $XY_4$ is selected from the group consisting of $X'O_{4-x'}Y'_x$, $X'O_{4-y}Y'_{2y}$, $X''S_4$, and mixtures thereof, where $X'$ is P, As, Sb, Si, Ge, S, and mixtures thereof; $X''$ is P, As, Sb, Si, Ge and mixtures thereof; $Y'$ is halogen; $0 \leq x < 3$; and $0 < y < 4$; and $0 < c \leq 3$;
(d) Z is OH, halogen, or mixtures thereof, and $0 < d \leq 6$; and
wherein M, X, Y, Z, a, b, c, d, x and y are selected so as to maintain electroneutrality of said compound.

In a preferred embodiment, M comprises two or more transition metals from Groups 4 to 11 of the Periodic Table. In another preferred embodiment, M comprises M'M", where M' is at least one transition metal from Groups 4 to 11 of the Periodic Table; and M" is at least one element from Groups 2, 3, 12, 13, or 14 of the Periodic Table. Preferred embodiments include those where c=1, those where c=2, and those where c=3. Preferred embodiments include those where $a \leq 1$ and c=1, those where a=2 and c=1, and those where $a \geq 3$ and c=3. Preferred embodiments also include those having a structure similar to the mineral olivine (herein "olivines"), and those having a structure similar to NASICON (NA Super Ionic CONductor) materials (herein "NASICONs").

This invention also provides electrodes comprising an electrode active material of this invention. Also provided are batteries that comprise a first electrode having an electrode active material of this invention; a second electrode having a compatible active material; and an electrolyte. In a preferred embodiment, the novel electrode material of this invention is used as a positive electrode (cathode) active material, reversibly cycling lithium ions with a compatible negative electrode (anode) active material.

It has been found that the novel electrode materials, electrodes, and batteries of this invention afford benefits over such materials and devices among those known in the art. Such benefits include increased capacity, enhanced cycling capability, enhanced reversibility, and reduced costs. Specific benefits and embodiments of the present invention are apparent from the detailed description set forth herein. It should be understood, however, that the detailed description and specific examples, while indicating embodiments among those preferred, are intended for purposes of illustration only and are not intended to limited the scope of the invention.

DESCRIPTION OF THE INVENTION

The present invention provides electrode active materials for use in a battery. As used herein, "battery" refers to a device comprising one or more electrochemical cells for the production of electricity. Each electrochemical cell comprises an anode, a cathode, and an electrolyte. Two or more electrochemical cells may be combined, or "stacked," so as to create a multi-cell battery having a voltage that is the sum of the voltages of the individual cells.

The electrode active materials of this invention may be used in the anode, the cathode, or both. Preferably, the active materials of this invention are used in the cathode. (As used herein, the terms "cathode" and "anode" refer to the electrodes at which oxidation and reduction occur, respectively, during battery discharge. During charging of the battery, the sites of oxidation and reduction are reversed. Also, as used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.)

Electrode Active Materials:

The present invention provides active materials (herein "electrode active materials") comprising lithium or other alkali metals, a transition metal, a phosphate or similar moiety, and a halogen or hydroxyl moiety. Such electrode active materials include those of the formula $A_a M_b (XY_4)_c Z_d$. (As used herein, the word "include," and its variants, is intended to be non-limiting, such that recitation of items in a list is not to the exclusion of other like items that may also be useful in the materials, compositions, devices, and methods of this invention.)

A is selected from the group consisting of Li (lithium), Na (sodium), K (potassium), and mixtures thereof. In a preferred embodiment, A is Li, or a mixture of Li with Na, a mixture of Li with K, or a mixture of Li, Na and K. In another preferred embodiment, A is Na, or a mixture of Na with K. Preferably "a" is from about 0.1 to about 6, more preferably from about 0.2 to about 6. Where c=1, a is preferably from about 0.1 to about 3, preferably from about 0.2 to about 2. In a preferred embodiment, where c=1, a is less than about 1. In another preferred embodiment, where c=1, a is about 2. Where c=2, a is preferably from about 0.1 to about 6, preferably from about 1 to about 6. Where c=3, a is preferably from about 0.1 to about 6, preferably from about 2 to about 6, preferably from about 3 to about 6.

M comprises one or more metals, comprising at least one metal which is capable of undergoing oxidation to a higher valence state. In a preferred embodiment, removal of alkali metal from the electrode active material is accompanied by a change in oxidation state of at least one of the metals comprising M. The amount of said metal that is available for oxidation in the electrode active material determines the amount of alkali metal that may be removed. Such concepts are, in general application, well known in the art, e.g., as disclosed in U.S. Pat. No. 4,477,541, Fraioli, issued Oct. 16, 1984; and U.S. Pat. No. 6,136,472, Barker, et al., issued Oct. 24, 2000, both of which are incorporated by reference herein.

Referring to the general formula $A_aM_b(XY_4)_cZ_d$, the amount (a') of alkali metal that can be removed, as a function of the quantity (b') and valency ($V^M$) of oxidizable metal, is $$a'=b'(\Delta V^M),$$

where $\Delta V^M$ is the difference between the valence state of the metal in the active material and a valence state readily available for the metal. (The term oxidation state and valence state are used in the art interchangeably.) For example, for an active material comprising iron (Fe) in the +2 oxidation state, $\Delta V^M=1$, wherein iron may be oxidized to the +3 oxidation state (although iron may also be oxidized to a +4 oxidation state in some circumstances). If b=2 (two moles of Fe per mole of material), the maximum amount (a') of alkali metal (oxidation state +1) that can be removed during cycling of the battery is 2 (two moles of alkali metal). If the active material comprises manganese (Mn) in the +2 oxidation state, $\Delta V^M=2$, wherein manganese may be oxidized to the +4 oxidation state (although Mn may also be oxidized to higher oxidation states in some circumstances). Thus, in this example, the maximum amount (a') of alkali metal that can be removed during cycling of the battery is 4, assuming that $a \geq 4$.

M may comprise a single metal, or a combination of two or more metals. In embodiments where M is a combination of elements, the total valence of M in the active material must be such that the resulting active material is electrically neutral (i.e., the positive charges of all anionic species in the material balance the negative charges of all cationic species), as further discussed below. The net valence of M ($V^M$) having a mixture of elements (M1, M2 . . . Mt) may be represented by the formula $$V^M = V^{M1}b_1 + V^{M2}b_2 + \ldots V^{Mt}b_t,$$

where $b_1+b_2+\ldots b_t=1$, and $V^{M1}$ is the oxidation state of M1, $V^{M2}$ is the oxidation state of M2, etc. (The net valence of M and other components of the electrode active material is discussed further, below.)

M may be, in general, a metal or metalloid, selected from the group consisting of elements from Groups 2–14 of the Periodic Table. As referred to herein, "Group" refers to the Group numbers (i.e., columns) of the Periodic Table as defined in the current IUPAC Periodic Table. See, e.g., U.S. Pat. No. 6,136,472, Barker et al., issued Oct. 24, 2000, incorporated by reference herein. In a preferred embodiment, M comprises one or more transition metals from Groups 4 to 11. In another preferred embodiment, M comprises a mixture of metals, M'M", where M' is at least one transition metal from Groups 4 to 11, and M" is at least one element which is from Groups 2, 3, 12, 13, or 14.

Transition metals useful herein include those selected from the group consisting of Ti (Titanium), V (Vanadium), Cr (Chromium), Mn (Manganese), Fe (Iron), Co (Cobalt), Ni (Nickel), Cu (Copper), Zr (Zirconium), Nb (Niobium), Mo (Molybdenum), Ru (Ruthenium), Rh (Rhodium), Pd (Palladium), Ag (Silver), Cd (Cadmium), Hf (Hafnium), Ta (Tantalum), W (Tungsten), Re (Rhenium), Os (Osmium), Ir (Iridium), Pt (Platinum), Au (Gold), Hg (Mercury), and mixtures thereof. Preferred are the first row transition series (the 4th Period of the Periodic Table), selected from the group consisting of Ti, V, Cr, Mn, Fe, Co, Ni, Cu, and mixtures thereof. Particularly preferred transition metals useful here include Fe, Co, Mn, Cu, V, Cr, and mixtures thereof. In some embodiments, mixtures of transition metals are preferred. Although, a variety of oxidation states for such transition metals are available, in some embodiments it is preferred that the transition metals have a +2 oxidation state.

M may also comprise non-transition metals and metalloids. Among such elements are those selected from the group consisting of Group 2 elements, particularly Be (Beryllium), Mg (Magnesium), Ca (Calcium), Sr (Strontium), Ba (Barium); Group 3 elements, particularly Sc (Scandium), Y (Yttrium), and the lanthanides, particularly La (Lanthanum), Ce (Cerium), Pr (Praseodymium), Nd (Neodymium), Sm (Samarium); Group 12 elements, particularly Zn (zinc) and Cd (cadmium); Group 13 elements, particularly B (Boron), Al (Aluminum), Ga (Gallium), In (Indium), Tl (Thallium); Group 14 elements, particularly Si (Silicon), Ge (Germanium), Sn (Tin), and Pb (Lead); Group 15 elements, particularly As (Arsenic), Sb (Antimony), and Bi (Bismuth); Group 16 elements, particularly Te (Tellurium); and mixtures thereof. Preferred non-transition metals include the Group 2 elements, Group 12 elements, Group 13 elements, and Group 14 elements. Particularly preferred non-transition metals include those selected from the group consisting of Mg, Ca, Zn, Sr, Pb, Cd, Sn, Ba, Be, Al, and mixtures thereof. Particularly preferred are non-transition metals selected from the group consisting of Mg, Ca, Zn, Ba, Al, and mixtures thereof.

As further discussed herein, "b" is selected so as to maintain electroneutrality of the electrode active material. In a preferred embodiment, where c=1, b is from about 1 to about 2, preferably about 1. In another preferred embodiment, where c=2, b is from about 2 to about 3, preferably about 2.

$XY_4$ is selected from the group consisting of $X'O_{4-x}Y'_x$, $X'O_{4-y}Y'_{2y}$, $X"S_4$, and mixtures thereof, where X' is P (phosphorus), As (arsenic), Sb (antimony), Si (silicon), Ge (germanium), S (sulfur), and mixtures thereof; X" is P, As, Sb, Si, Ge and mixtures thereof. In a preferred embodiment, X' and X" are, respectively, selected from the group consisting of P, Si, and mixtures thereof. In a particularly preferred embodiment, X' and X" are P. Y is halogen, preferably F (fluorine).

In a preferred embodiment 0<x<3; and 0<y<4, such that a portion of the oxygen (O) in the $XY_4$ moiety is substituted with halogen. In another preferred embodiment, x and y are 0. In a particularly preferred embodiment $XY_4$ is $X'O_4$, where X' is preferably P or Si, more preferably P.

Z is OH, halogen, or mixtures thereof. In a preferred embodiment, Z is selected from the group consisting of OH (hydroxyl), F (fluorine), Cl (chlorine), Br (bromine) and mixtures thereof. In a preferred embodiment, Z is OH. In another preferred embodiment, Z is F, or mixtures of F with OH, Cl, or Br. Preferably "d" is from about 0.1 to about 6, more preferably from about 0.2 to about 6. Where c=1, d is preferably from about 0.1 to about 3, preferably from about 0.2 to about 2. In a preferred embodiment, where c=1, d is about 1. Where c=2, d is preferably from about 0.1 to about 6, preferably from about 1 to about 6. Where c=3, d is preferably from about 0.1 to about 6, preferably from about 2 to about 6, preferably from about 3 to about 6.

The composition of M, X, Y, and Z, and the values of a, b, c, d, x and y, are selected so as to maintain electroneutrality of the electrode active material. As referred to herein "electroneutrality" is the state of the electrode active material wherein the sum of the cationic charged species (e.g., M and X) in the material is equal to the sum of the anionic charged species (e.g., Y and Z) in the material. Preferably, the $XY_4$ moieties are comprised to be, as a unit moiety, an anion having a charge of −2, −3, or −4, depending on the selection of X.

In general, the valence state of each component element of the electrode active material may be determined in reference to the composition and valence state of the other component elements of the material. By reference to the general formula $A_aM_b(XY_4)_cZ_d$, the electroneutrality of the material may be determined using the formula $$(V^A)a+(V^M)b+(V^X)c=(V^Y)4c+(V^Z)d$$

where $V^A$ is the net valence of A, $V^M$ is the net valence of M, $V^Y$ is the net valence of Y, and $V^Z$ is the net valence of Z. As referred to herein, the "net valence" of a component is (a) the valence state for a component having a single element which occurs in the active material in a single valence state; or (b) the mole-weighted sum of the valence states of all elements in a component comprising more than one element, or comprising a single element having more than one valence state. The net valence of each component is represented in the following formulae.

$$(V^A)b=[(V^{A1})a^1+(Val^{A2})a^2+\ldots(Val^{An})a^n]/n;\ a^1+a^2+\ldots a^n=a$$

$$(V^M)b=[(V^{M1})b^1+(V^{M2})b^2+\ldots(V^{Mn})b^n]/n;\ b^1+b^2+\ldots b^n=b$$

$$(V^X)c=[(V^{X1})c^1+(V^{X2})c^2+\ldots(V^{Xn})c^n]/n;\ c^1+c^2+\ldots c^n=c$$

$$(V^Y)c=[(V^{Y1})c^1+(V^{Y2})c^2+\ldots(V^{Yn})c^n]/n;\ c^1+c^2+\ldots c^n=c$$

$$(V^Z)c=[(V^{Z1})c^1+(V^{Z2})c^2+\ldots(V^{Zn})c^n]/n;\ c^1+c^2+\ldots c^n=c$$

In general, the quantity and composition of M is selected given the valency of X, the value of "c," and the amount of A, so long as M comprises at least one metal that is capable of oxidation. The calculation for the valence of M can be simplified, where $V^A=1, V^Z=1$, as follows.

For compounds where $c=1$: $(V^M)b=(V^A)4+d-a-(V^X)$

For compounds where $c=3$: $(V^M)b=(V^A)12+d-a-(V^X)3$

The values of a, b, c, d, x, and y may result in stoichiometric or non-stoichiometric formulas for the electrode active materials. In a preferred embodiment, the values of a, b, c, d, x, and y are all integer values, resulting in a stoichiometric formula. In another preferred embodiment, one or more of a, b, c, d, x and y may have non-integer values. It is understood, however, in embodiments having a lattice structure comprising multiple units of a non-stoichiometric formula $A_aM_b(XY_4)_cZ_d$, that the formula may be stoichiometric when looking at a multiple of the unit. That is, for a unit formula where one or more of a, b, c, d, x, or y is a non-integer, the values of each variable become an integer value with respect to a number of units that is the least common multiplier of each of a, b, c, d, x and y. For example, the active material $Li_2Fe_{0.5}Mg_{0.5}PO_4F$ is non-stoichiometric. However, in a material comprising two of such units in a lattice structure, the formula is $Li_4FeMg(PO_4)_2F_2$.

A preferred non-stoichiometric electrode active material is of the formula $Li_{1+z}MPO_4F_z$ where $0<z\leq3$, preferably $0<z\leq1$. Another preferred non-stoichiometric electrode active material is of the formula $Li_{1+z}M'_{1-y}M''_yPO_4F_z$; where $0<z<3$, preferably $0<z<1$; and $0\leq y<1$. A particularly preferred non-stoichiometric active material is $Li_{1.25}Fe_{0.9}Mg_{0.1}PO_4F_{0.25}$.

A preferred electrode active material embodiment comprises a compound of the formula $$Li_aM_b(PO_4)Z_d,$$

wherein (a) $0.1<a\leq4$;

(b) M is M'M", where M' is at least one transition metal from Groups 4 to 11 of the Periodic Table; and M" is at least one element which is from Group 2, 12, 13, or 14 of the Periodic Table, and $1\leq b\leq3$; and (c) Z comprises halogen, and $0.1<d\leq4$; and wherein M, Z, a, b, and d are selected so as to maintain electroneutrality of said compound.

Preferably, M' is selected from the group consisting of Fe, Co, Ni, Mn, Cu, V, Zr, Ti, Cr, and mixtures thereof; more preferably M' is selected from the group consisting of Fe, Co, Mn, Cu, V, Cr, and mixtures thereof. Preferably, M" is selected from the group consisting of Mg, Ca, Zn, Sr, Pb, Cd, Sn, Ba, Be, Al, and mixtures thereof; more preferably M" is selected from the group consisting of Mg, Ca, Zn, Ba, Al, and mixtures thereof. Preferably Z comprises F.

Another preferred embodiment comprises a compound of the formula $$Li_aM_b(PO_4)Z_d,$$

wherein (a) $0.1<a\leq4$;

(b) M is one or more metals, comprising at least one metal which is capable of undergoing oxidation to a higher valence state, and $1\leq b\leq3$; and (c) Z is OH or a mixture of OH and halogen, and $0.1<d\leq4$; and wherein M, Z, a, b, and d are selected so as to maintain electroneutrality of said compound.

Preferably, M comprises M'M", where M' is at least one transition metal from Groups 4 to 11 of the Periodic Table; and M" is at least one element from Groups 2, 3, 12, 13, or 14 of the Periodic Table. Preferably M' is selected from the group consisting of Fe, Co, Ni, Mn, Cu, V, Zr, Ti, Cr, and mixtures thereof; more preferably M' is selected from the group consisting of Fe, Co, Mn, Cu, V, Cr, and mixtures thereof. Preferably M is not Ni, when $a=2$ and $d=1$. Preferably M" is selected from the group consisting of Mg, Ca, Zn, Sr, Pb, Cd, Sn, Ba, Be, Al, and mixtures thereof; more preferably M" is selected from the group consisting of Mg, Ca, Zn, Ba, Al, and mixtures thereof.

Another preferred embodiment comprises a compound of the formula $$A_2M(PO_4)Z_d,$$

wherein (a) A is selected from the group consisting of Li, Na, K, and mixtures thereof;

(b) M is $M'_{1-b}M''_b$, where M' is at least one transition metal from Groups 4 to 11 of the Periodic Table; and M" is at least one element which is from Group 2, 3, 12, 13, or 14 of the Periodic Table, and $0\leq b<1$; and (c) Z comprises halogen, and $0.1<d\leq2$; and wherein M, Z, b, and d are selected so as to maintain electroneutrality of said compound.

Preferably A is Li, or mixtures of Li with Na, K, or mixtures of Na and K. Preferably, M' is selected from the group consisting of Fe, Co, Mn, Cu, V, Zr, Ti, Cr, and mixtures thereof; more preferably M' is selected from the group consisting of Fe, Co, Mn, Cu, V, Cr, and mixtures thereof. Preferably, M" is selected from the group consisting of Mg, Ca, Zn, Sr, Pb, Cd, Sn, Ba, Be, Al, and mixtures thereof; more preferably, M" is selected from the group consisting of Mg, Ca, Zn, Ba, Al, and mixtures thereof. Preferably, Z comprises F. Preferably M is not Ni, when $d=1$. In a preferred embodiment M' is Fe or Co, M" is Mg, and X is F. A particularly preferred embodiment is $Li_2Fe_{1-x}Mg_xPO_4F$. Preferred electrode active materials include $Li_2Fe_{0.9}Mg_{0.1}PO_4F$, and $Li_2Fe_{0.8}Mg_{0.2}PO_4F$.

A preferred electrode active material is of the formula $Li_2MPO_4F$, wherein M is selected from the group consisting of Ti, V, Cr, Mn, Fe, Co, Cu, Zn, or mixtures thereof, preferably Fe, Co, Mn, or mixtures thereof. Among such preferred compounds is $Li_2CoPO_4F$ and $Li_2FePO_4F$.

Another preferred embodiment comprises a compound of the formula:

$$A_aM_b(XY_4)_3Z_d,$$

wherein (a) A is selected from the group consisting of Li, Na, K, and mixtures thereof, and $2 \leq a \leq 8$;

(b) M comprises one or more metals, comprising at least one metal which is capable of undergoing oxidation to a higher valence state, and $1 \leq b \leq 3$;

(c) $XY_4$ is selected from the group consisting of $X'O_{4-x}Y'_x$, $X'O_{4-y}Y'_{2y}$, $X''S_4$, and mixtures thereof, where X' is P, As, Sb, Si, Ge, S, and mixtures thereof; X" is P, As, Sb, Si, Ge and mixtures thereof; Y' is halogen; $0 \leq x < 3$; and $0 < y < 4$;

(d) Z is OH, halogen, or mixtures thereof, and $0 < d < 6$; and wherein M, X, Y, Z, a, b, d, x and y are selected so as to maintain electroneutrality of said compound.

In a preferred embodiment, A comprises Li, or mixtures of Li with Na or K. In another preferred embodiment, A comprises Na, K, or mixtures thereof. In a preferred embodiment, M comprises two or more transition metals from Groups 4 to 11 of the Periodic Table, preferably transition metals selected from the group consisting of Fe, Co, Ni, Mn, Cu, V, Zr, Ti, Cr, and mixtures thereof. In another preferred embodiment, M comprises M'M", where M' is at least one transition metal from Groups 4 to 11 of the Periodic Table; and M" is at least one element from Groups 2, 3, 12, 13, or 14 of the Periodic Table having a +2 valence state. Preferably, M' is selected from the group consisting of Fe, Co, Ni, Mn, Cu, V, Zr, Ti, Cr, and mixtures thereof; more preferably M' is selected from the group consisting of Fe, Co, Mn, Cu, V, Cr, and mixtures thereof. Preferably, M" is selected from the group consisting of Mg, Ca, Zn, Sr, Pb, Cd, Sn, Ba, Be, Al, and mixtures thereof; more preferably, M" is selected from the group consisting of Mg, Ca, Zn, Ba, Al, and mixtures thereof. In a preferred embodiment, $XY_4$ is preferably $PO_4$. In another preferred embodiment, X' comprises As, Sb, Si, Ge, S, and mixtures thereof; X" comprises As, Sb, Si, Ge and mixtures thereof; and $0 < x < 3$. In a preferred embodiment, Z comprises F, or mixtures of F with Cl, Br, OH, or mixtures thereof. In another preferred embodiment, Z comprises OH, or mixtures thereof with Cl or Br. Preferred electrode actives include those of the following formulae.

$A_{4+d}M'M''(PO_4)_3Z_d$ where M' is a +3 oxidation state transition or non-transition metal and M" is a +2 oxidation state transition metal or non-transition metal.

$A_{3+d}M'M''(PO_4)_3Z_d$ where M' is a +4 oxidation state transition metal or non-transition and M" is a +2 oxidation state transition metal or non-transition metal.

$A_{3+d}M_2(PO_4)_3Z_d$, where M is a +3 oxidation state transition metal $A_{1+d}M_2(PO_4)_3Z_d$, where M is a +4 oxidation state transition metal $A_{5+d}M_2(PO_4)_3Z_d$, where M is a +2 oxidation state transition metal, or mixture with a +2 oxidation state non-transition metal $A_{2+d}M_2(SiO_4)_2(PO_4)Z_d$, where M is a +4 oxidation state transition metal $A_{3+2x+d}M_2(SiO_4)_{3-x}(PO_4)_xZ_d$, where M is a +3 oxidation state transition metal $A_{4+d}M_2(SiO_4)_3Z_d$, where M is a +4 oxidation state transition metal $A_{6+d}M_2(SiO_4)_3Z_d$, where M is a +3 oxidation state transition metal $A_{2+d}M_2(SO_4)_3Z_d$, where M is a +2 oxidation state transition metal, or mixture with a +2 oxidation state non-transition metal $A_{1+d}M'M''(SO_4)_3Z_d$, where M' is a +2 oxidation state metal; and M" is a +3 oxidation state transition metal.

Among the preferred embodiments of this invention are the following electrode active materials: $Li_2Fe_{0.8}Mg_{0.2}PO_4F$; $Li_2Fe_{0.5}Co_{0.5}PO_4F$; $Li_3CoPO_4F_2$; $KFe(PO_3F)F$; $Li_2Co(PO_3F)Br_2$; $Li_2Fe(PO_3F_2)F$; $Li_2FePO_4Cl$; $Li_2MnPO_4OH$; $Li_2CoPO_4F$; $Li_2Fe_{0.5}Co_{0.5}PO_4F$; $Li_2Fe_{0.9}Mg_{0.1}PO_4F$; $Li_2Fe_{0.8}Mg_{0.2}PO_4F$; $Li_{1.25}Fe_{0.9}Mg_{0.1}PO_4F_{0.25}$; $Li_2MnPO_4F$; $Li_2CuPO_4F$; $K_2Fe_{0.9}Mg_{0.1}PO_{0.5}As_{0.5}O_4F$; $Li_2MnSbO_4OH$; $Li_2Fe_{0.6}Co_{0.4}SbO_4Br$; $Na_3CoAsO_4F_2$; $LiFe(AsO_3F)Cl$; $Li_2Co(As_{0.5}Sb_{0.5}O_3F)F_2$; $K_2Fe(AsO_3F_2)F$; $Li_2NiSbO_4F$; $Li_2FeAsO_4OH$; $Li_3Mn_2(PO_4)_3F$; $Na_4FeMn(PO_4)_3OH$; $Li_4FeV(PO_4)_3Br$; $Li_3VAl(PO_4)_3F$; $K_3MgV(PO_4)_3Cl$; $LiKNaTiFe(PO_4)_3F$; $Li_4Fe_2(PO_{3.82}F_{0.68})_3$; $Li_3FeMn(PO_{3.67}F_{0.33})_3$; $Li_4Ti_2(PO_4)_3Br$; $Li_3V_2(PO_4)_3F_2$; $Li_6FeMg(PO_4)_3OH$; $Li_3Mn_2(AsO_4)_3F$; $K_4FeMn(AsO_4)_3OH$; $Li_4FeV(P_{0.5}Sb_{0.5}O_4)_3Br$; $LiNaKAlV(AsO_4)_3F$; $K_3MgV(SbO_4)_3Cl$; $Li_3TiFe(SbO_4)_3F$; $Li_4Fe_2(SbO_{3.82}F_{0.68})_3$; $Li_3FeMn(P_{0.5}As_{0.5}O_{3.67}F_{0.33})_3$; $Li_4Ti_2(PO_4)_3F$; $Li_{3.25}V_2(PO_4)_3F_{0.25}$; $Li_3Na_{0.75}Fe_2(PO_4)_3F_{0.75}$; $Na_{4.5}Fe_2(PO_4)_3(OH)Cl_{0.5}$; $K_8Ti_2(PO_4)_3F_3Br_2$; $K_8Ti_2(PO_4)_3F_5$; $Li_2Ti_2(PO_4)_3F$; $LiNa_{1.25}V_2(PO_4)_3F_{0.5}Cl_{0.75}$; $K_{1.25}Mn_2(PO_4)_3OH_{0.25}$; $LiNa_{1.25}KTiV(PO_4)_3(OH)_{1.25}Cl$; $Na_6Ti_2(PO_4)_3F_3Cl_2$; $Li_7Fe_2(PO_4)_3F_2$; $Li_8FeMg(PO_4)_3F_{2.25}Cl_{0.75}$; $Li_5Na_{2.5}TiMn(PO_4)_3(OH)_2Cl_{0.5}$; $Na_3K_{4.5}MnCa(PO_4)_3(OH)_{1.5}Br$; $K_9FeBa(PO_4)_3F_2Cl_2$ $Li_5Ti_2(SiO_4)_2(PO_4)F_2$; $Na_6Mn_2(SiO_4)_2(PO_4)F_2Cl$; $Li_5TiFe(PO_4)_3F$; $Na_4K_2VMg(PO_4)_3FCl$; $Li_4NaAlNi(PO_4)_3(OH)$; $Li_3K_3FeMg(PO_4)_3F_2$; $Li_2Na_2K_2CrMn(PO_4)_3(OH)Br$; $Li_4TiCa(PO_4)_3F$; $Li_4Ti_{0.75}Fe_{1.5}(PO_4)_3F$; $Li_3NaSnFe(PO_4)_3(OH)$; $Li_3NaGe_{0.5}Ni_2(PO_4)_3(OH)$; $Na_3K_2VCo(PO_4)_3(OH)Cl$; $Li_3Na_2MnCa(PO_4)_3F(OH)$; $Li_3NaKTiFe(PO_4)_3F$; $Li_6FeCo(SiO_4)_2(PO_4)F$; $Li_3Na_3TiV(SiO_4)_2(PO_4)F$; $K_{5.5}CrMn(SiO_4)_2(PO_4)Cl_{0.5}$; $Li_3Na_{2.5}V_2(SiO_4)_2(PO_4)(OH)_{0.5}$; $Na_{5.25}FeMn(SiO_4)_2(PO_4)Br_{0.25}$; $Li_4NaVTi(SiO_4)_3F_{0.5}Cl_{0.5}$; $Na_2K_{2.5}ZrV(SiO_4)_3F_{0.5}$; $Li_4K_2MnV(SiO_4)_3(OH)_2$; $Li_2Na_2KTi_2(SiO_4)_3F$; $K_6V_2(SiO_4)_3(OH)Br$; $Li_8FeMn(SiO_4)_3F_2$; $Na_3K_{4.5}CoNi(SiO_4)_3(OH)_{1.5}$; $Li_3Na_2K_2TiV(SiO_4)_3(OH)_{0.5}Cl_{0.5}$; $K_9VCr(SiO_4)_3F_2Cl$; $Li_4Na_4V_2(SiO_4)_3FBr$; $Li_4FeMg(SO_4)F_2$; $Na_2KNiCo(SO_4)(OH)$; $Na_5MnCa(SO_4)F_2Cl$; $Li_3NaCuBa(SO_4)FBr$; $Li_{2.5}K_{0.5}FeZn(SO_4)F$; $Li_3MgFe(SO_4)_3F_2$; $Li_2NaCaV(SO_4)_3FCl$; $Na_4NiMn(SO_4)_3(OH)_2$; $NaKBaFe(SO_4)_3F$; $Li_2KCuV(SO_4)_3(OH)Br$; $Li_{1.5}CoPO_4F_{0.5}$; $Li_{1.25}CuPO_4F_{0.25}$; $Li_{1.75}FePO_4F_{0.75}$; $Li_{1.66}MnPO_4F_{0.66}$; $Li_{1.5}Co_{0.75}Ca_{0.25}PO_4F_{0.5}$; $Li_{1.75}Co_{0.8}Mn_{0.2}PO_4F_{0.75}$; $Li_{1.25}Fe_{0.75}Mg_{0.25}PO_4F_{0.25}$; $Li_{1.66}Cu_{0.6}Zn_{0.4}PO_4F_{0.66}$; $Li_{1.75}Mn_{0.8}Mg_{0.2}PO_4F_{0.75}$; $Li_2CUSiF_6$; $LiCoSiO_4F$; $Li_2CoSiO_4F$; $KMnSiO_4Cl$; $KMn_2SiO_4Cl$; $Li_2VSiO_4(OH)_2$; $LiFeCuSiO_4F_2$; $LiFeSiO_3F_3$; $NaMnSiO_3F_4$; $Li_2CuSiO_3Cl_3$; $Li_2CuGef$; $Li_2FeGeF$; $LiCoGeO_4F$; $Li_2CoGeO_4F$; $Li_3CoGeO_4F$; $NaMnSi_{0.5}Ge_{0.5}O_4Cl$; $Li_2TiGeO_4(OH)_2$; $LiFeCuGeO_4F_2$; $NaFeSi_{0.5}Ge_{0.5}O_3F_3$; $LiNaCuGeO_3Cl_3$; $Li_5Mn_2(SiO_4)_3FCl$; $Li_2K_2Mn_2(SiO_4)_3F$; $Na_3Mn(SiO_{3.66}F_{0.39})OH$; $Li_4CuFe(GeO_4)_3Cl$; $Li_3Mn_2(GeO_4)_3OH$;

$Na_3K_2Mn_2(SiO_{0.5}Ge_{0.5}O_4)_3F_2$; $Li_4Mn_2(GeO_4)_3F$; $KLi_2Fe_2(Si_{0.5}Ge_{0.5}O_4)Br$; $Li_4Fe(GeO_{3.66}F_{0.39})3F$; $Na_3Mn(GeO_{3.66}F_{0.39})OH$; $LiMnSO_4F$; $NaFe_{0.9}Mg_{0.1}SO_4Cl$; $LiFeSO_4F$; $LiMnSO_4OH$; $KMnSO_4F$; $Li_4Mn_3(SO_4)_3OH$; $Li_5Fe_2Al(SO_4)_3Cl$; $Li_4Fe(SO_{1.32}F_{2.63})_3BrCl$; $Na_3Mn(SO_{1.32}F_{2.68})_3OH$; $Li_2FeAl(SO_{1.32}F_{2.68})_3F$; $Li_2FeZn(PO_4)F_2$; $Li_{0.5}Co_{0.75}Mg_{0.5}(PO_4)F_{0.75}$; $Li_3Mn_{0.5}Al_{0.5}(PO_4)F_{3.5}$; $Li_{0.75}VCa(PO_4)F_{1.75}$; $Li_4CuBa(PO_4)F_4$; $Li_{0.5}Mn_{0.5}Ca(PO_4)(OH)_{1.5}$; $Li_{1.5}FeMg(PO_4)(OH)Cl$; $LiFeCoCa(PO_4)(OH)_3F$; $Li_3CuBa(PO_4)(OH)_2Br_2$; $Li_{0.75}Mn_{1.5}Al(PO_4)(OH)_{3.75}$; $Li_2Co_{0.75}Mg_{0.25}(PO_4)F$; $LiNaCo_{0.8}Mg_{0.2}(PO_4)F$; $NaKCu_{0.5}Mg_{0.5}(PO_4)F$; $LiNa_{0.5}K_{0.5}Fe_{0.75}Mg_{0.25}(PO_4)F$; $Li_{1.5}K_{0.5}V_{0.5}Zn_{0.5}(PO_4)F_2$; $Li_6CuCa(SbO_2F_4)_3F$; $Na_6Fe_2Mg(PS_4)_3(OH_2)Cl$; $Li_4K_3CoAl(AsO_2F_4)_3F_3$; $Li_4Fe_{1.5}Co_{0.5}(PO_3F)_3(OH)_{3.5}$; $K_8FeMg(PO_3F)_3F_3Cl_3$; $Li_5Fe_2Al(SO_4)_3Cl$; $LiFe_2(SO_4)_3Cl$; $LiMn_2(SO_4)_3F$; $Li_3Ni_2(SO_4)_3Cl$; $Li_3Co_2(SO_4)_3F$; $Li_3Fe_2(SO_4)_3Br$; $Li_3Mn_2(SO_4)_3F$; $Li_3MnFe(SO_4)_3F$; $Li_3NiCo(SO_4)_3Cl$; $LiMnSO_4F$; $LiFeSO_4Cl$; $LiNiSO_4F$; $LiCoSO_4Cl$; $LiMn_{1-x}Fe_xSO_4F$, $LiFe_{1-x}Mg_xSO_4F$; $Li_7ZrMn(SiO_4)_3F$, $Li_7MnCo(SiO_4)_3F$, $Li_7MnNi(SiO_4)_3F$, $Li_7VAl(SiO_4)_3F$; $Li_4MnCo(PO_4)_2(SiO_4)F$; $Li_4VAl(PO_4)_2(SiO_4)F$; $Li_4MnV(PO_4)_2(SiO_4)F$; $Li_4CoFe(PO_4)_2(SiO_4)F$; $Li_{0.6}VPO_4F_{0.6}$; $Li_{0.8}VPO_4F_{0.8}$; $LiVPO_4F$; $Li_3V_2(PO_4)_2F_3$; $LiVPO_4Cl$; $LiVPO_4OH$; $NaVPO_4F$; $Na_3V_2(PO_4)F$; and mixtures thereof.

Methods of Manufacture:

Active materials of general formula $A_aM_b(XY_4)_cZ_d$ are readily synthesized by reacting starting materials in a solid state reaction, with or without simultaneous oxidation or reduction of the metal species involved. According to the desired values of a, b, c, and d in the product, starting materials are chosen that contain "a" moles of alkali metal A from all sources, "b" moles of metals M from all sources, "c" moles of phosphate (or other $XY_4$ species) from all sources, and "d" moles of halide or hydroxide Z, again taking into account all sources. As discussed below, a particular starting material may the be source of more than one of the components A, M, $XY_4$, or Z. Alternatively it is possible to run the reaction with an excess of one or more of the starting materials. In such a case, the stoichiometry of the product will be determined by the limiting reagent among the components A, M, $XY_4$, and Z. Because in such a case at least some of the starting materials will be present in the reaction product mixture, it is usually desirable to provide exact molar amounts of all the starting materials.

Sources of alkali metal include any of a number of salts or ionic compounds of lithium, sodium, potassium, rubidium or cesium. Lithium, sodium, and potassium compounds are preferred. Preferably, the alkali metal source is provided in powder or particulate form. A wide range of such materials is well known in the field of inorganic chemistry. Non-limiting examples include the lithium, sodium, and/or potassium fluorides, chlorides, bromides, iodides, nitrates, nitrites, sulfates, hydrogen sulfates, sulfites, bisulfites, carbonates, bicarbonates, borates, phosphates, hydrogen phosphates, dihydrogen phosphates, silicates, antimonates, arsenates, germinates, oxides, acetates, oxalates, and the like. Hydrates of the above compounds may also be used, as well as mixtures. In particular, the mixtures may contain more than one alkali metal so that a mixed alkali metal active material will be produced in the reaction.

Sources of metals M include salts or compounds of any of the transition metals, alkaline earth metals, or lanthanide metals, as well as of non-transition metals such as aluminum, gallium, indium, thallium, tin, lead, and bismuth. The metal compounds include, without limitation, fluorides, chlorides, bromides, iodides, nitrates, nitrites, sulfates, hydrogen sulfates, sulfites, bisulfites, carbonates, bicarbonates, borates, phosphates, hydrogen phosphates, dihydrogen phosphates, silicates, antimonates, arsenates, germanates, oxides, hydroxides, acetates, oxalates, and the like. Hydrates may also be used, as well as mixtures of metals, as with the alkali metals, so that alkali metal mixed metal active materials are produced. The metal M in the starting material may have any oxidation state, depending the oxidation state required in the desired product and the oxidizing or reducing conditions contemplated, as discussed below. The metal sources are chosen so that at least one metal in the final reaction product is capable of being in an oxidation state higher than it is in the reaction product.

Sources of the desired starting material anions such as the phosphates, halides, and hydroxides are provided by a number of salts or compounds containing positively charged cations in addition to the source of phosphate (or other $XY_4$ species), halide, or hydroxide. Such cations include, without limitation, metal ions such as the alkali metals, alkaline metals, transition metals, or other non-transition metals, as well as complex cations such as ammonium or quaternary quaternary ammonium. The phosphate anion in such compounds may be phosphate, hydrogen phosphate, or dihydrogen phosphate. As with the alkali metal source and metal source discussed above, the phosphate, halide, or hydroxide starting materials are preferably provided in particulate or powder form. Hydrates of any of the above may be used, as can mixtures of the above.

A starting material may provide more than one of the components A, M, $XY_4$, and Z, as is evident in the list above. In various embodiments of the invention, starting materials are provided that combine, for example, the alkali metal and halide together, or the metal and the phosphate. Thus for example, lithium, sodium, or potassium fluoride may be reacted with a metal phosphate such as vanadium phosphate or chromium phosphate, or with a mixture of metal compounds such as a metal phosphate and a metal hydroxide. In one B embodiment, a starting material is provided that contains alkali metal, metal, and phosphate. There is complete flexibility to select starting materials containing any of the components of alkali metal A, metal M, phosphate (or other $XY_4$ moiety), and halide/hydroxide Z, depending on availability. Combinations of starting materials providing each of the components may also be used.

In general, any anion may be combined with the alkali metal cation to provide the alkali metal source starting material, or with the metal M cation to provide the metal M starting material. Likewise, any cation may be combined with the halide or hydroxide anion to provide the source of Z component starting material, and any cation may be used as counterion to the phosphate or similar $XY_4$ component. It is preferred, however, to select starting materials with counterions that give rise to volatile by-products. Thus, it is desirable to choose ammonium salts, carbonates, oxides, hydroxides, and the like where possible. Starting materials with these counterions tend to form volatile by-products such as water, ammonia, and carbon dioxide, which can be readily removed from the reaction mixture. This concept is well illustrated in the Examples below.

The sources of components A, M, phosphate (or other $XY_4$ moiety), and Z may be reacted together in the solid state while heating for a time and temperature sufficient to make a reaction product. The starting materials are provided in powder or particulate form. The powders are mixed together with any of a variety of procedures, such as by ball milling without attrition, blending in a mortar and pestle, and the like. Thereafter the mixture of powdered starting materials is compressed into a tablet and/or held together with a binder material to form a closely cohering reaction mixture. The reaction mixture is heated in an oven, generally at a temperature of about 400° C. or greater until a reaction product forms. However, when Z in the active material is hydroxide, it is preferable to heat at a lower temperature so as to avoid volatilizing water instead of incorporating hydroxyl into the reaction product. Exemplary times and temperatures for the reaction are given in the Examples below.

When the starting materials contain hydroxyl for incorporation into the reaction product, the reaction temperature is preferably less than about 400° C., and more preferably about 250° C. or less. One way of achieving such temperatures is to carry out the reaction hydrothermally, as illustrated in Examples 15 and 16. In a hydrothermal reaction, the starting materials are mixed with a small amount of a liquid such as water, and placed in a pressurized bomb. The reaction temperature is limited to that which can be achieved by heating the liquid water under pressure.

The reaction may be carried out without redox, or if desired under reducing or oxidizing conditions. When the reaction is done without redox, the oxidation state of the metal or mixed metals in the reaction product is the same as in the starting materials. Such a scheme is illustrated, for example, in Example 16. Oxidizing conditions may be provided by running the reaction in air. Thus, oxygen from the air is used in Example 12 to oxidize the starting material cobalt having an average oxidation state of +2.67 (8/3) to an oxidation state of +3 in the final product.

The reaction may also be carried out with reduction. For example, the reaction may be carried out in a reducing atmosphere such as hydrogen, ammonia, methane, or a mixture of reducing gases. Alternatively, the reduction may be carried out in situ by including the reaction mixture a reductant that will participate in the reaction to reduce the metal M, but that will produce by-products that will not interfere with the active material when used later in an electrode or an electrochemical cell. One convenient reductant to use to make the active materials of the invention is a reducing carbon. In a preferred embodiment, the reaction is carried out in an inert atmosphere such as argon, nitrogen, or carbon dioxide. Such reducing carbon is conveniently provided by elemental carbon, or by an organic material that can decompose under the reaction conditions to form elemental carbon or a similar carbon containing species that has reducing power. Such organic materials include, without limitation, glycerol, starch, sugars, cokes, and organic polymers which carbonize or pyrolize under the reaction conditions to produce a reducing form of carbon. A preferred source of reducing carbon is elemental carbon. Carbothermal reduction is illustrated in Examples 7, 19, and 21.

The stoichiometry of the reduction can be selected along with the relative stoichiometric amounts of the starting components A, M, $PO_4$ (or other $XY_4$ moiety), and Z. It is usually easier to provide the reducing agent in stoichiometric excess and remove the excess, if desired, after the reaction. In the case of the reducing gases and the use of reducing carbon such as elemental carbon, any excess reducing agent does not present a problem. In the former case, the gas is volatile and is easily separated from the reaction mixture, while in the latter, the excess carbon in the reaction product does not harm the properties of the active material, because carbon is generally added to the active material to form an electrode material for use in the electrochemical cells and batteries of the invention. Conveniently also, the by-products carbon monoxide or carbon dioxide (in the case of carbon) or water (in the case of hydrogen) are readily removed from the reaction mixture.

A stoichiometry of reaction of a mixture of starting materials with hydrogen gas is illustrated in the table, giving the products formed when starting materials are reacted with 'n' moles of hydrogen according to the reaction:

$$nH_2 + Li_2CO_3 + M_2O_5 + LiF + 3NH_4H_2PO_4 \rightarrow \text{Reaction product (below)}$$

| Value of 'n' | Reaction Product | Volatile by-products |
|---|---|---|
| 1 | $Li_2M_2(PO_4)_3F$ | $0.5\ CO_2 + 3\ NH_3 + 5.5\ H_2O$ |
| 1.5 | $Li_3M_2(PO_4)_3F$ | $CO_2 + 3\ NH_3 + 6\ H_2O$ |
| 2.5 | $Li_3M_2P_3O_{11}F$ | $CO_2 + 3\ NH_3 + 7\ H_2O$ |

The extent of reduction is not dependent simply on the amount of hydrogen present—it is always available in excess. It is dependent on the temperature of reaction. Higher temperatures will facilitate greater reducing power.

In addition whether one gets e.g. $(PO_4)_3F$ or $P_3O_{11}F$ in the final product depend on the thermodynamics of formation of the product. The lower energy product will be favored.

At a temperature where only one mole of hydrogen reacts, the $M^{+5}$ in the starting material is reduced to $M^{+4}$, allowing for the incorporation of only 2 lithiums in the reaction product. When 1.5 moles of hydrogen react, the metal is reduced to $M^+3.5$ on average, considering the stoichiometry of reduction. With 2.5 moles of hydrogen, the metal is reduced to $M^{+2.5}$ on average. Here there is not enough lithium in the balanced reaction to counterbalance along with the metal the −10 charge of the $(PO_4)_3F$ group. For this reason, the reaction product has instead a modified $P_3O_{11}F$ moiety with a charge of −8, allowing the $Li_3$ to balance the charge. The table illustrates how important it is to consider all the stoichiometries when synthesizing the $A_aM_b(PO_4)_cZ_d$ active materials of the invention.

When using a reducing atmosphere, it is difficult to provide less than an excess of reducing gas such as hydrogen. Under such as a situation, it is preferred to control the stoichiometry of the reaction by the other limiting reagents, as illustrated in the table. Alternatively the reduction may be carried out in the presence of reducing carbon such as elemental carbon. Experimentally, it would be possible to use precise amounts of reductant carbon as illustrated in the table for the case of reductant hydrogen to make products of a chosen stoichiometry. However, it is preferred to carry out the carbothermal reduction in a molar excess of carbon. As with the reducing atmosphere, this is easier to do experimentally, and it leads to a product with excess carbon dispersed into the reaction product, which as noted above provides a useful active electrode material.

The carbothermal reduction method of synthesis of mixed metal phosphates has been described in PCT Publication WO/01/53198, Barker et al., incorporated by reference herein. The carbothermal method may be used to react starting materials in the presence of reducing carbon to form a variety of products. The carbon functions to reduce a metal ion in the starting material metal M source. The reducing carbon, for example in the form of elemental carbon powder, is mixed with the other starting materials and heated. For best results, the temperature should be about 400° C. or greater, and up to about 950° C. Higher temperatures may be used, but are usually not required.

Generally, higher temperature (about 650° C. to about 1000° C.) reactions produce CO as a by-product whereas $CO_2$ production is favored at lower temperatures (generally up to about 650° C.). The higher temperature reactions produce CO effluent and the stoichiometry requires more carbon be used than the case where $CO_2$ effluent is produced at lower temperature. This is because the reducing effect of the C to $CO_2$ reaction is greater than the C to CO reaction. The C to $CO_2$ reaction involves an increase in carbon oxidation state of +4 (from 0 to 4) and the C to CO reaction involves an increase in carbon oxidation state of +2 (from ground state zero to 2). In principle, such would affect the planning of the reaction, as one would have to consider not only the stoichiometry of the reductant but also the temperature of the reaction. When an excess of carbon is used, however, such concerns do not arise. It is therefore preferred to use an excess of carbon, and control the stoichiometry of the reaction with another of the starting materials as limiting reagent.

As noted above, the active materials $A_aM_b(XY_4)_cZ_d$ of the invention can contain a mixture of alkali metals A, a mixture of metals B, a mixture of components Z, and a phosphate group representative of the $XY_4$ group in the formula. In another aspect of the invention, the phosphate group can be completely or partially substituted by a number of other $XY_4$ moieties, which will also be referred to as "phosphate replacements" or "modified phosphates". Thus, active materials are provided according to the invention wherein the $XY_4$ moiety is a phosphate group that is completely or partially replaced by such moieties as sulfate ($SO_4^{2-}$), monofluoromonophosphate, ($PO_3F^{2-}$), difluoromonophosphate ($PO_2F_2^-$), silicate ($SiO_4^{4-}$), arsenate, antimonate, and germanate. Analogues of the above oxygenate anions where some or all of the oxygen is replaced by sulfur are also useful in the active materials of the invention, with the exception that the sulfate group may not be completely substituted with sulfur. For example thiomonophosphates may also be used as a complete or partial replacement for phosphate in the active materials of the invention. Such thiomonophosphates include the anions $PO_3S^{3-}$, $PO_2S_2^{3-}$, $POS_3^{3-}$, and $PS_4^{3-}$. They are most conveniently available as the sodium, lithium, or potassium derivative.

To synthesize the active materials containing the modified phosphate moieties, it is usually possible to substitute all or part of the phosphate compounds discussed above with a source of the replacement anion. The replacement is considered on a stoichiometric basis and the starting materials providing the source of the replacement anions are provided along with the other starting materials as discussed above. Synthesis of the active materials containing the modified phosphate groups proceeds as discussed above, either without redox or under oxidizing or reducing conditions. As was the case with the phosphate compounds, the compound containing the modified or replacement phosphate group or groups may also be a source of other components of the active materials. For example, the alkali metal and/or the mixed metal M may be a part of the modified phosphate compound.

Non-limiting examples of sources of monofluoromonophosphates include $Na_2PO_3F$, $K_2PO_3F$, $(NH_4)_2PO_3F\cdot H_2O$, $LiNaPO_3F\cdot H_2O$, $LiKPO_3F$, $LiNH_4PO_3F$, $NaNH_4PO_3F$, $NaK_3(PO_3F)_2$ and $CaPO_3F\cdot 2H_2O$. Representative examples of sources of difluoromonophosphate compounds include, without limitation, $NH_4PO_2F_2$, $NaPO_2F_2$, $KPO_2F_2$, $Al(PO_2F_2)_3$, and $Fe(PO_2F_2)_3$.

When it is desired to partially or completely substitute phosphorous in the active materials for silicon, it is possible to use a wide variety of silicates and other silicon containing compounds. Thus, useful sources of silicon in the active materials of the invention include orthosilicates, pyrosilicates, cyclic silicate anions such as $Si_3O_9^{6-}$, $Si_6O_{18}^{12-}$ and the like and pyrocenes represented by the formula ($SiO_3^{2-}$), for example $LiAl(SiO_3)_2$. Silica or $SiO_2$ may also be used. Partial substitution of silicate for phosphate is illustrated in Example 23.

Representative arsenate compounds that may be used to prepare the active materials of the invention include $H_3AsO_4$ and salts of the anions $[H_2AsO_4]^-$ and $[HAsO_4]^{2-}$. Sources of antimonate in the active materials can be provided by antimony-containing materials such as $Sb_2O_5$, $M^ISbO_3$ where $M^I$ is a metal having oxidation state +1, $M^{III}SbO_4$ where $M^{III}$ is a metal having an oxidation state of +3, and $M^{II}Sb_2O_7$ where $M^{II}$ is a metal having oxidation state of +2. Additional sources of antimonate include compounds such as $Li_3SbO_4$, $NH_4H_2SbO_4$, and other alkali metal and/or ammonium mixed salts of the $[SbO_4]^{3-}$ anion. Partial substitution of phosphate by antimonate is illustrated in Example 24.

Sources of sulfate compounds that can be used to partially or completely replace phosphorous in the active materials with sulfur include alkali metal and transition metal sulfates and bisulfates as well as mixed metal sulfates such as $(NH_4)_2Fe(SO_4)_2$, $NH_4Fe(SO_4)_2$ and the like. Finally, when it is desired to replace part or all of the phosphorous in the active materials with germanium, a germanium containing compound such as $GeO_2$ may be used.

To prepare the active materials containing the modified phosphate groups, it suffices to choose the stoichiometry of the starting materials based on the desired stoichiometry of the modified phosphate groups in the final product and react the starting materials together according to the procedures described above with respect to the phosphate materials. Naturally, partial or complete substitution of the phosphate group with any of the above modified or replacement phosphate groups will entail a recalculation of the stoichiometry of the required starting materials.

In a preferred embodiment, a two-step method is used to prepare the general formula $Li_{1-x}MPO_4F_x$ which consists of the initial preparation of a $LiMPO_4$ compound (step 1), which is then reacted with x moles of LiF to provide $Li_2MPO_4F$ (step 2). The starting (precursor) materials for the first step include a lithium containing compound, a metal containing compound and a phosphate containing compound. Each of these compounds may be individually available or may be incorporated within the same compounds, such as a lithium metal compound or a metal phosphate compound.

Following the preparation in step one, step two of the reaction proceeds to react the lithium metal phosphate (provided in step 1) with a lithium salt, preferably lithium fluoride (LiF). The LiF is mixed in proportion with the lithium metal phosphate to provide a lithiated transition metal fluorophosphate product. The lithiated transition metal fluorophosphate has the capacity to provide lithium ions for electrochemical potential.

In addition to the previously described two-step method, a one step reaction method may be used in preparing such preferred materials of the present invention. In one method of this invention, the starting materials are intimately mixed and then reacted together when initiated by heat. In general, the mixed powders are pressed into a pellet. The pellet is then heated to an elevated temperature. This reaction can be run under an air atmosphere or a non-oxidizing atmosphere. In another method, the lithium metal phosphate compound used as a precursor for the lithiated transition metal fluorophosphate reaction can be formed either by a carbothermal reaction, or by a hydrogen reduction reaction.

The general aspects of the above synthesis route are applicable to a variety of starting materials. The metal compounds may be reduced in the presence of a reducing agent, such as hydrogen or carbon. The same considerations apply to other metal and phosphate containing starting materials. The thermodynamic considerations such as ease of reduction of the selected starting materials, the reaction kinetics, and the melting point of the salts will cause adjustment in the general procedure, such as the amount of reducing agent, the temperature of the reaction, and the dwell time.

The first step of a preferred two-step method includes reacting a lithium containing compound (lithium carbonate, $Li_2CO_3$), a metal containing compound having a phosphate group (for example, nickel phosphate, $Ni_3(PO_4)_2 \cdot xH_2O$, which usually has more than one mole of water), and a phosphoric acid derivative (such as a diammonium hydrogen phosphate, DAHP). The powders are pre-mixed with a mortar and pestle until uniformly dispersed, although various methods of mixing may be used. The mixed powders of the starting materials are pressed into pellets. The first stage reaction is conducted by heating the pellets in an oven at a preferred heating rate to an elevated temperature, and held at such elevated temperature for several hours. A preferred ramp rate of about 2° C./minute is used to heat to a preferable temperature of about 800° C. Although in many instances a heating rate is desirable for a reaction, it is not always necessary for the success of the reaction. The reaction is carried out under a flowing air atmosphere (e.g., when M is Ni or Co), although the reaction could be carried out in an inert atmosphere such as $N_2$ or Ar (when M is Fe). The flow rate will depend on the size of the oven and the quantity needed to maintain the atmosphere. The reaction mixture is held at the elevated temperature for a time sufficient for the reaction product to be formed. The pellets are then allowed to cool to ambient temperature. The rate at which a sample is cooled may vary.

In the second step, the $Li_2MPO_4F$ active material is prepared by reacting the $LiMPO_4$ precursor made in step one with a lithium salt, preferably lithium fluoride LiF. Alternatively, the precursors may include a lithium salt other than a halide (for example, lithium carbonate) and a halide material other than lithium fluoride (for example ammonium fluoride). The precursors for step 2 are initially pre-mixed using a mortar and pestle until uniformly dispersed. The mixture is then pelletized, for example by using a manual pellet press and an approximate 1.5" diameter die-set. The resulting pellet is preferably about 5 mm thick and uniform. The pellets are then transferred to a temperature-controlled tube furnace and heated at a preferred ramp rate of about 2° C./minute to an ultimate temperature of about 800° C. The entire reaction is conducted in a flowing argon gas atmosphere. Prior to being removed from the box oven, the pellet is allowed to cool to room temperature. As stated previously, the rate in which the pellet is cooled does not seem to have a direct impact on the product.

Examples 1–6, and 8 illustrate the two step process described above, while Examples 7, 11, 12, and 13 show a one-step procedure. Example 9 gives a two-step procedure for making sodium-containing active materials of the invention.

An alternate embodiment of the present invention is the preparation of a mixed metal-lithium fluorophosphate compound. Example 6 demonstrates the two stage reaction resulting in the general nominal formula $Li_2M'_xM''_{1-x}PO_4F$ wherein $0 \leq x < 1$. In general, a lithium or other alkali metal compound, at least two metal compounds, and a phosphate compound are reacted together in a first step to provide a lithium mixed metal phosphate precursor. As previously described in other reactions, the powders are mixed together and pelletized. The pellet is then transferred to a temperature-controlled tube furnace equipped with a flowing inert gas (such as argon). The sample is then heated for example at a ramp rate of about 2° C./minute to an ultimate temperature of about 750° C. and maintained at this temperature for eight hours or until a reaction product is formed. As can be seen in various examples, the specific temperatures used vary depending on what initial compounds were used to form the precursor, but the standards described in no way limit the application of the present invention to various compounds. In particular, a high temperature is desirable due to the carbothermal reaction occurring during the formation of the precursor. Following the heating of the pellet for a specified period of time, the pellet was cooled to room temperature.

The second stage provides the reaction of the lithium mixed metal phosphate compound with an alkali metal halide such as lithium fluoride. Following the making of the pellet from the lithium mixed metal phosphate precursor and the lithium fluoride, the pellet is placed inside a covered and sealed nickel crucible and transferred to a box oven. In general, the nickel crucible is a convenient enclosure for the pellet although other suitable containers, such as a ceramic crucible, may also be used. The sample is then heated rapidly to an ultimate temperature of about 700° C. and maintained at this temperature for about 15 minutes. The crucible is then removed from the box oven and cooled to room temperature. The result is a lithiated transition metal fluorophosphate compound of the present invention.

In addition to the general nominal formula $Li_2M'_xM''_{1-x}PO_4F$, a non-stoichiometric mixed metal lithium fluorophosphate having the general nominal formula $Li_{1+z}M'_yM''_{1-y}PO_4F_z$ is provided in Example 8. The same conditions are met when preparing the non-stoichiometric formula as are followed when preparing the stoichiometric formula, such as Example 6. In Example 8, the mole ratio of lithiated transition metal phosphate precursor to lithium fluoride is about 1.0 to 0.25. The precursor compounds are pre-mixed using a mortar and pestle and then pelletized. The pellet is then placed inside a covered and sealed crucible and transferred to a box oven. The sample is rapidly heated to an ultimate temperature of about 700° C. and maintained at this temperature for about 15 minutes. Similar conditions apply when preparing the nominal general formula $Li_{1+z}MPO_4F_z$.

Referring back to the discussion of the lithium fluoride and metal phosphate reaction, the temperature of reaction is preferably about 400° C. or higher but below the melting point of the metal phosphate, and more preferably at about 700° C. It is preferred to heat the precursors at a ramp rate in a range from a fraction of a degree to about 10° C. per minute and preferably about 2° C. per minute. Once the desired temperature is attained, the reactions are held at the reaction temperature from about 10 minutes to several hours, depending on the reaction temperature chosen. The heating may be conducted under an air atmosphere, or if desired may be conducted under a non-oxidizing or inert atmosphere. After reaction, the products are cooled from the elevated temperature to ambient (room) temperature (i.e. from about 10° C. to about 40° C.). Desirably, the cooling occurs at a rate of about 50° C./minute. Such cooling has been found to be adequate to achieve the desired structure of the final product in some cases. It is also possible to quench the products at a cooling rate on the order of about 100° C./minute. In some instances, such rapid cooling may be preferred. A generalized rate of cooling has not been found applicable for certain cases, therefore the suggested cooling requirements vary.

Electrodes:

The present invention also provides electrodes comprising an electrode active material of the present invention. In a preferred embodiment, the electrodes of the present invention comprise an electrode active material of this invention, a binder; and an electrically conductive carbonaceous material.

In a preferred embodiment, the electrodes of this invention comprise:

(a) from about 25% to about 95%, more preferably from about 50% to about 90%, active material;

(b) from about 2% to about 95% electrically conductive material (e.g., carbon black); and (c) from about 3% to about 20% binder chosen to hold all particulate materials in contact with one another without degrading ionic conductivity.

(Unless stated otherwise, all percentages herein are by weight.) Cathodes of this invention preferably comprise from about 50% to about 90% of active material, about 5% to about 30% of the electrically conductive material, and the balance comprising binder. Anodes of this invention preferably comprise from about 50% to about 95% by weight of the electrically conductive material (e.g., a preferred graphite), with the balance comprising binder.

Electrically conductive materials among those useful herein include carbon black, graphite, powdered nickel, metal particles, conductive polymers (e.g., characterized by a conjugated network of double bonds like polypyrrole and polyacetylene), and mixtures thereof. Binders useful herein preferably comprise a polymeric material and extractable plasticizer suitable for forming a bound porous composite. Preferred binders include halogenated hydrocarbon polymers (such as poly(vinylidene chloride) and poly((dichloro—1,4-phenylene)ethylene), fluorinated urethanes, fluorinated epoxides, fluorinated acrylics, copolymers of halogenated hydrocarbon polymers, epoxides, ethylene propylene diamine termonomer (EPDM), ethylene propylene diamine termonomer (EPDM), polyvinylidene difluoride (PVDF), hexafluoropropylene (HFP), ethylene acrylic acid copolymer (EAA), ethylene vinyl acetate copolymer (EVA), EAA/EVA copolymers, PVDF/HFP copolymers, and mixtures thereof.

In a preferred process for making an electrode, the electrode active material is mixed into a slurry with a polymeric binder compound, a solvent, a plasticizer, and optionally the electroconductive material. The active material slurry is appropriately agitated, and then thinly applied to a substrate via a doctor blade. The substrate can be a removable substrate or a functional substrate, such as a current collector (for example, a metallic grid or mesh layer) attached to one side of the electrode film. In one embodiment, heat or radiation is applied to evaporate the solvent from the electrode film, leaving a solid residue. The electrode film is further consolidated, where heat and pressure are applied to the film to sinter and calendar it. In another embodiment, the film may be air-dried at moderate temperature to yield self-supporting films of copolymer composition. If the substrate is of a removable type it is removed from the electrode film, and further laminated to a current collector. With either type of substrate it may be necessary to extract the remaining plasticizer prior to incorporation into the battery cell.

Batteries:

The batteries of the present invention comprise:

(a) a first electrode comprising an active material of the present invention;

(b) a second electrode which is a counter-electrode to said first electrode; and (c) an electrolyte between said electrodes.

The electrode active material of this invention may comprise the anode, the cathode, or both. Preferably, the electrode active material comprises the cathode.

The active material of the second, counter-electrode is any material compatible with the electrode active material of this invention. In embodiments where the electrode active material comprises the cathode, the anode may comprise any of a variety of compatible anodic materials well known in the art, including lithium, lithium alloys, such as alloys of lithium with aluminum, mercury, manganese, iron, zinc, and intercalation based anodes such as those employing carbon, tungsten oxides, and mixtures thereof. In a preferred embodiment, the anode comprises:

(a) from about 0% to about 95%, preferably from about 25% to about 95%, more preferably from about 50% to about 90%, of an insertion material;

(b) from about 2% to about 95% electrically conductive material (e.g., carbon black); and (c) from about 3% to about 20% binder chosen to hold all particulate materials in contact with one another without degrading ionic conductivity.

In a particularly preferred embodiment, the anode comprises from about 50% to about 90% of an insertion material selected from the group active material from the group consisting of metal oxides (particularly transition metal oxides), metal chalcogenides, and mixtures thereof. In another preferred embodiment, the anode does not contain an insertion active, but the electrically conductive material comprises an insertion matrix comprising carbon, graphite, cokes, mesocarbons and mixtures thereof. One preferred anode intercalation material is carbon, such as coke or graphite, which is capable of forming the compound $Li_xC$. Insertion anodes among those useful herein are described in U.S. Pat. No. 5,700,298, Shi et al., issued Dec. 23, 1997; U.S. Pat. No. 5,712,059, Barker et al., issued Jan. 27, 1998; U.S. Pat. No. 5,830,602, Barker et al., issued Nov. 3, 1998; and U.S. Pat. No. 6,103,419, Saidi et al., issued Aug. 15, 2000; all of which are incorporated by reference herein.

In embodiments where the electrode active material comprises the anode, the cathode preferably comprises:

(a) from about 25% to about 95%, more preferably from about 50% to about 90%, active material;

(b) from about 2% to about 95% electrically conductive material (e.g., carbon black); and (c) from about 3% to about 20% binder chosen to hold all particulate materials in contact with one another without degrading ionic conductivity.

Active materials useful in such cathodes include electrode active materials of this invention, as well as metal oxides (particularly transition metal oxides), metal chalcogenides, and mixtures thereof. Other active materials include lithiated transition metal oxides such as $LiCoO_2$, $LiNiO_2$, and mixed transition metal oxides such as $LiCo_xNi_{1-x}O_2$, where $0<x<1$. Another preferred active material includes lithiated spinel active materials exemplified by compositions having a structure of $LiMn_2O_4$, as well as surface treated spinels such as disclosed in U.S. Pat. No. 6,183,718, Barker et al., issued Feb. 6, 2001, incorporated by reference herein. Blends of two or more of any of the above active materials may also be used. The cathode may alternatively further comprise a basic compound to protect against electrode degradation as described in U.S. Pat. No. 5,869,207, issued Feb. 9, 1999, incorporated by reference herein.

The batteries of this invention also comprise a suitable electrolyte that provides for transfer of ions between the cathode and anode. The electrolyte is preferably a material that exhibits high ionic conductivity, as well as having insular properties to prevent self-discharging during storage. The electrolyte can be either a liquid or a solid. Solid electrolytes preferably comprise a polymeric matrix which contains an ionic conductive medium. A liquid electrolyte preferably comprises a solvent and an alkali metal salt that form an ionically conducting liquid.

One preferred embodiment is a solid polymeric electrolyte, comprising a solid polymeric matrix of an electrolyte compatible material formed by polymerizing an organic or inorganic monomer (or partial polymer thereof) and which, when used in combination with the other components of the electrolyte, results in a solid state electrolyte. Suitable solid polymeric matrices include those well known in the art and include solid matrices formed from organic polymers, inorganic polymers or a solid matrix forming monomer and from partial polymers of a solid matrix forming monomer.

The polymeric electrolyte matrix comprises a salt, typically inorganic, which is homogeneously dispersed via a solvent vehicle throughout the matrix. The solvent is preferably a low molecular weight organic solvent added to the electrolyte, which may serve the purpose of solvating the inorganic ion salt. The solvent is preferably any compatible, relatively non-volatile, aprotic, relatively polar solvent, including dimethyl carbonaten (DMC), diethyl carbonate (DEC), dipropylcarbonate (DPC), ethyl methyl carbonate (EMC), butylene carbonate, gamma-butyrolactone, triglyme, tetraglyme, lactones, esters, dimethylsulfoxide, dioxolane, sulfolane, and mixtures thereof. Preferred solvents include EC/DMC, EC/DEC, EC/DPC and EC/EMC. Preferably, the inorganic ion salt is a lithium or sodium salt, such as for example, $LiAsF_6$, $LiPF_6$, $LiClO_4$, $LiB(C_6H_5)_4$, $LiAlCl_4$, LiBr, and mixtures thereof, with the less toxic salts being preferable. The salt content is preferably from about 5% to about 65%, preferably from about 8% to about 35%. A preferred embodiment is a mixture of EC:DMC:$LiPF_6$ in a weight ratio of about 60:30:10. Electrolyte compositions among those useful herein are described in U.S. Pat. No. 5,418,091, Gozdz et al., issued May 23, 1995; U.S. Pat. No. 5,508,130, Golovin, issued Apr. 16, 1996; U.S. Pat. No. 5,541,020, Golovin et al., issued Jul. 30, 1996; U.S. Pat. No. 5,620,810, Golovin et al., issued Apr. 15, 1997; U.S. Pat. No. 5,643,695, Barker et al., issued Jul. 1, 1997; U.S. Pat. No. 5,712,059, Barker et al., issued Jan. 27, 1997; U.S. Pat. No. 5,851,504, Barker et al., issued Dec. 22, 1998; U.S. Pat. No. 6,020,087, Gao, issued Feb. 1, 2001; and U.S. Pat. No. 6,103,419, Saidi et al., issued Aug. 15, 2000; all of which are incorporated by reference herein.

Additionally, the electrolyte comprises a separator, or is surrounded by a separator membrane. The separator allows the migration of ions through the membrane while still providing a physical separation of the electric charge between the electrodes, to prevent short-circuiting. Preferably, the separator also inhibits elevated temperatures within the battery that can occur due to uncontrolled reactions, preferably by degrading upon high temperatures to provide infinite resistance to prevent further uncontrolled reactions. In a preferred embodiment, the polymeric matrix of the electrolyte can contain an additional polymer (a separator) or the original polymeric matrix itself may function as a separator, providing the physical isolation needed between the anode and cathode.

A preferred electrolyte separator film comprises approximately two parts polymer for every one part of a preferred fumed silica. The conductive solvent comprises any number of suitable solvents and salts. Desirable solvents and salts are described in U.S. Pat. No. 5,643,695, Barker et al., issued Jul. 1, 1997; and U.S. Pat. No. 5,418,091, Gozdz et al., issued May 23, 1995; both of which are incorporated by reference herein. One example is a mixture of EC:DMC:$LiPF_6$ in a weight ratio of about 60:30:10.

A separator membrane element is generally polymeric and prepared from a composition comprising a copolymer. A preferred composition is the 75 to 92% vinylidene fluoride with 8 to 25% hexafluoropropylene copolymer (available commercially from Atochem North America as Kynar FLEX) and an organic solvent plasticizer. Such a copolymer composition is also preferred for the preparation of the electrode membrane elements, since subsequent laminate interface compatibility is ensured. The plasticizing solvent may be one of the various organic compounds commonly used as solvents for electrolyte salts, e.g., propylene carbonate or ethylene carbonate, as well as mixtures of these compounds. Higher-boiling plasticizer compounds such as dibutyl phthalate, dimethyl phthalate, diethyl phthalate, and tris butoxyethyl phosphate are preferred. Inorganic filler adjuncts, such as fumed alumina or silanized fumed silica, may be used to enhance the physical strength and melt viscosity of a separator membrane and, in some compositions, to increase the subsequent level of electrolyte solution absorption.

A preferred battery comprises a laminated cell structure, comprising an anode layer, a cathode layer, and electrolyte/separator between the anode and cathode layers. The anode and cathode layers comprise a current collector. A preferred current collector is a copper collector foil, preferably in the form of an open mesh grid. The current collector is connected to an external current collector tab, for a description of tabs and collectors. Such structures are disclosed in, for example, U.S. Pat. No. 4,925,752, Fauteux et al, issued May 15, 1990; U.S. Pat. No. 5,011,501, Shackle et al., issued Apr. 30, 1991; and U.S. Pat. No. 5,326,653, Chang, issued Jul. 5, 1994; all of which are incorporated by reference herein. In a battery embodiment comprising multiple electrochemical cells, the anode tabs are preferably welded together and connected to a nickel lead. The cathode tabs are similarly welded and connected to a welded lead, whereby each lead forms the polarized access points for the external load.

Lamination of assembled cell structures is accomplished by conventional means by pressing between metal plates at a temperature of about 120–160° C. Subsequent to lamination, the battery cell material may be stored either with the retained plasticizer or as a dry sheet after extraction of the plasticizer with a selective low-boiling point solvent. The plasticizer extraction solvent is not critical, and methanol or ether are often used.

In a preferred embodiment, a electrode membrane comprising the electrode active material (e.g., an insertion material such as carbon or graphite or a insertion compound) dispersed in a polymeric binder matrix. The electrolyte/separator film membrane is preferably a plasticized copolymer, comprising a polymeric separator and a suitable electrolyte for ion transport. The electrolyte/separator is positioned upon the electrode element and is covered with a positive electrode membrane comprising a composition of a finely divided lithium insertion compound in a polymeric binder matrix. An aluminum collector foil or grid completes the assembly. A protective bagging material covers the cell and prevents infiltration of air and moisture.

In another embodiment, a multi-cell battery configuration may be prepared with copper current collector, a negative electrode, an electrolyte/separator, a positive electrode, and an aluminum current collector. Tabs of the current collector elements form respective terminals for the battery structure.

In a preferred embodiment of a lithium-ion battery, a current collector layer of aluminum foil or grid is overlaid with a positive electrode film, or membrane, separately prepared as a coated layer of a dispersion of insertion electrode composition. This is preferably an insertion compound such as the active material of the present invention in powder form in a copolymer matrix solution, which is dried to form the positive electrode. An electrolyte/separator membrane is formed as a dried coating of a composition comprising a solution containing VdF:HFP copolymer and a plasticizer solvent is then overlaid on the positive electrode film. A negative electrode membrane formed as a dried coating of a powdered carbon or other negative electrode material dispersion in a VdF:HFP copolymer matrix solution is similarly overlaid on the separator membrane layer. A copper current collector foil or grid is laid upon the negative electrode layer to complete the cell assembly. Therefore, the VdF:HFP copolymer composition is used as a binder in all of the major cell components, positive electrode film, negative electrode film, and electrolyte/separator membrane. The assembled components are then heated under pressure to achieve heat-fusion bonding between the plasticized copolymer matrix electrode and electrolyte components, and to the collector grids, to thereby form an effective laminate of cell elements. This produces an essentially unitary and flexible battery cell structure.

Cells comprising electrodes, electrolytes and other materials among those useful herein are described in the following documents, all of which are incorporated by reference herein: U.S. Pat. No. 4,668,595, Yoshino et al., issued May 26, 1987; U.S. Pat. No. 4,792,504, Schwab et al., issued Dec. 20, 1988; U.S. Pat. No. 4,830,939, Lee et al., issued May 16, 1989; U.S. Pat. No. 4,935,317, Fauteaux et al., issued Jun. 19, 1980; U.S. Pat. No. 4,990,413, Lee et al., issued Feb 5, 1991; U.S. Pat. No. 5,037,712, Shackle et al., issued Aug. 6, 1991; U.S. Pat. No. 5,262,253, Golovin, issued Nov. 16, 1993; U.S. Pat. No. 5,300,373, Shackle, issued Apr. 5, 1994; U.S. Pat. No. 5,399,447, Chaloner-Gill, et al., issued Mar. 21, 1995; U.S. Pat. No. 5,411,820, Chaloner-Gill, issued May 2, 1995; U.S. Pat. No. 5,435,054, Tonder et al., issued Jul. 25, 1995; U.S. Pat. No. 5,463,179, Chaloner-Gill et al., issued Oct. 31, 1995; U.S. Pat. No. 5,482,795, Chaloner-Gill., issued Jan. 9, 1996; U.S. Pat. No. 5,660,948, Barker, issued Sep. 16, 1995; and U.S. Pat. No. 6,306,215, Larkin, issued Oct. 23, 2001. A preferred electrolyte matrix comprises organic polymers, including VdF-:HFP. Examples of casting, lamination and formation of cells using VdF:HFP are as described in U.S. Pat. No. 5,418,091, Gozdz et al., issued May 23, 1995; U.S. Pat. No. 5,460,904, Gozdz et al., issued Oct. 24, 1995; U.S. Pat. No. 5,456,000, Gozdz et al., issued Oct. 10, 1995; and U.S. Pat. No. 5,540,741, Gozdz et al., issued Jul. 30, 1996; all of which are incorporated by reference herein.

The electrochemical cell architecture is typically governed by the electrolyte phase. A liquid electrolyte battery generally has a cylindrical shape, with a thick protective cover to prevent leakage of the internal liquid. Liquid electrolyte batteries tend to be bulkier relative to solid electrolyte batteries due to the liquid phase and extensive sealed cover. A solid electrolyte battery, is capable of miniaturization, and can be shaped into a thin film. This capability allows for a much greater flexibility when shaping the battery and configuring the receiving apparatus. The solid state polymer electrolyte cells can form flat sheets or prismatic (rectangular) packages, which can be modified to fit into the existing void spaces remaining in electronic devices during the design phase.

The following non-limiting examples illustrate the compositions and methods of the present invention.

EXAMPLE 1

An electrode active material comprising $Li_2NiPO_4F$, representative of the formula $Li_{1+x}NiPO_4F_x$, is made as follows. First, a $LiNiPO_4$ precursor is made according to the following reaction scheme.

$$0.5Li_2CO_3 + 0.334Ni_3(PO_4)_2 \cdot 7H_2O + 0.334(NH_4)_2HPO_4 \rightarrow LiNiPO_4 + 2.833H_2O + 0.667NH_3 + 0.5CO_2$$

A mixture of 36.95 g (0.5 mol) of $Li_2CO_3$, 164.01 (0.334 mol) of $Ni_3(PO_4)_2 \cdot 7H_2O$, and 44.11 g (0.334 mol) of $(NH_4)_2HPO_4$ is made, using a mortar and pestle. The mixture is pelletized, and transferred to a box oven equipped with a atmospheric air gas flow. The mixture is heated, at a ramp rate of about 2° C. minute to an ultimate temperature of about 800° C., and maintained at this temperature for 16 hours. The product is then cooled to ambient temperature (about 21° C.).

$Li_{1+x}NiPO_4F_x$ is then made from the $LiNiPO_4$ precursor. In the Example that follows, x is 1.0, so that the active material produced is represented by the formula $Li_2NiPO_4F$. The material is made according to the following reaction scheme.

$$LiNiPO_4 + xLiF \rightarrow Li_{1+x}NiPO_4F_x$$

For x equal to 1.0, a mixture of 160.85 (1 mol) $LiNiPO_4$ and 25.94 g (1 mol) LiF is made, using a mortar and pestle. The mixture is pelletized, and transferred to a temperature-controlled tube furnace equipped with a argon gas flow. The mixture is heated at a ramp rate of about 2°/minute to an ultimate temperature of about 850° C. The product is then cooled to ambient temperature (about 20° C.).

A cathode electrode is made comprising the $Li_2NiPO_4F$ electrode active material, comprising 80% of the electrode active material; 8% Super P carbon; and 12% KYNAR® binder. (KYNAR® is a commercially available PVdF:HFP copolymer used as binder material.) A battery is made comprising the cathode, a lithium metal anode, and an electrolyte comprising a 1 molar $LiPF_6$ dissolved in a 2:1 weight ratio mixture of EC and DMC.

EXAMPLE 2

An electrode active material comprising $Li_{1+x}CoPO_4F_x$ is made as follows. First, a $LiCoPO_4$ precursor is made according to the following reaction scheme.

$$0.334Li_3PO_4 + 0.334Co_3(PO_4)_2 \cdot 8H_2O \rightarrow LiCoPO_4 + 2.833H_2O$$

A mixture of 38.6 g (0.334 mol) of $Li_3PO_4$ and 170.29 g (0.334 mol) of $Co_3(PO_4)_2 \cdot 8H_2O$ is made, using a mortar and pestle. The mixture is pelletized, and transferred to a box oven equipped with a atmosphere air gas flow. The mixture is heated at a ramp rate of about 2°/minute to an ultimate temperature of about 800° C., and maintained at this temperature for about 8 hours. The product is then cooled to about 25° C.

$Li_{1+x}CoPO_4F_x$ is then made from the $LiCoPO_4$ precursor according to the following reaction scheme.

$$LiCoPO_4 + xLiF \rightarrow Li_{1+x}CoPO_4F_x$$

Illustrative for x equals 1.0, a mixture of 160.85 g (1.0 mol) of $LiCoPO_4$ and 25.94 g (1.0 mol) of LiF is made using a mortar and pestle. The mixture is then pelletized, and transferred to a temperature-controlled tube furnace equipped with an argon gas flow. The mixture is heated at a ramp rate of about 2° C./minute to an ultimate temperature of about 750° C. in the flowing argon gas atmosphere. The product is then cooled to ambient temperature (about 21° C.).

EXAMPLE 3

An electrode active material comprising $Li_{1+x}FePO_4F_x$ is made as follows. First, a $LiFePO_4$ precursor is made according to the following reaction scheme.

$$1.0LiH_2PO_4+0.5Fe_2O_3+0.5C \rightarrow LiFePO_4+0.5CO+1.0H_2O$$

A mixture of 103.93 (1.0 mol) of $LiH_2PO_4$, 79.86 g (0.5 mol) of $Fe_2O_3$, and 12.0 g (1.0 mol) of carbon (a 100% weight excess) is made, using a mortar and pestle. The mixture is pelletized, and transferred to a temperature-controlled tube furnace equipped with a argon gas flow. The mixture is heated at a ramp rate of about 2° C./minute to an ultimate temperature of about 750° C. in the inert atmosphere, and maintained at this temperature for about 8 hours. The product is then cooled to ambient temperature (about 20° C.).

The $Li_{1+x}FePO_4F_x$, is then from the $LiFePO_4$ precursor according to the following reaction scheme.

$$LiFePO_4+xLiF \rightarrow Li_{1+x}FePO_4F_x$$

For the case where x=1.0, a mixture of 157.76 g (1.0 mol) of $LiFePO_4$ and 25.94 g (1.0 mol) of LiF is made using a mortar and pestle. The mixture is pelletized, and transferred to a temperature-controlled tube furnace equipped with a flowing argon gas flow. The mixture is heated at a ramp rate of about 2°/minute to an ultimate temperature of about 750° C. in the inert atmosphere, and maintained at this temperature for about 8 hours. The product is then cooled to ambient temperature (about 18° C.).

EXAMPLE 4

An electrode active material comprising $Li_{1+x}MnPO_4F_x$ is made as follows, specifically exemplified for x=1.0. First, a $LiMnPO_4$ precursor is made by the following reaction scheme.

$$0.5Li_2CO_3+1.0MnO+1.0(NH_4)_2HPO_4 \rightarrow LiMnPO_4+2.0NH_3+1.5H_2O+0.5CO_2$$

A mixture of 36.95 g (0.5 mol) of $Li_2CO_3$, 70.94 g (1.0 mol) of MnO, and 132.06 g (1.0 mol) of $(NH_4)_2HPO_4$ is made, using a mortar and pestle. The mixture is pelletized, and transferred to a box oven equipped with a argon gas flow. The mixture is heated at a ramp rate of about 2°/minute to an ultimate temperature of about 700° C. and maintained at this temperature for about 24 hours. The product is then cooled to ambient temperature.

The $Li_{1+x}MnPO_4F_x$ is then from the $LiMnPO_4$ precursor by the following reaction scheme.

$$LiMnPO_4+xLiF \rightarrow Li_{1+x}MnPO_4F_x$$

For x=1.0, a mixture of 156.85 g (1.0 mol) of $LiMnPO_4$ and 25.94 g (1.0 mol) of LiF is made using a mortar and pestle. The mixture is pelletized, and transferred to a temperature-controlled tube furnace equipped with an argon gas flow. The mixture is heated at a ramp rate of about 2°/minute to an ultimate temperature of about 725° C. in the argon gas atmosphere. The product is then cooled to ambient temperature.

EXAMPLE 5

An electrode active material comprising $Li_{1+x}CuPO_4F_x$ is made as follows. First, a $LiCuPO_4$ precursor is made by the following reaction scheme.

$$0.5Li_2CO_3+1.0CuO+1.0(NH_4)_2HPO_4 \rightarrow LiCuPO_4+2.0NH_3+1.5H_2O+0.5CO_2$$

A mixture of 36.95 g (0.5 mol) of $Li_2CO_3$, 79.95 g (1.0 mol) of CuO, and 132.06 g (1.0 mol) of $(NH_4)_2HPO_4$ is made using a mortar and pestle. The mixture is pelletized, and transferred to a box oven equipped with an air flow. The mixture is heated at a ramp rate of about 2°/minute to an ultimate temperature of about 600° maintained at this temperature for about 8 hours. The product is then cooled to ambient temperature.

The $Li_{1+x}CuPO_4F_x$ is then made from the $LiCuPO_4$ precursor by the following reaction scheme.

$$LiCuPO_4+xLiF \rightarrow Li_{1+x}CuPO_4F_x$$

Illustrating for x=1.0, a mixture of 165.46 g (1.0 mol) of $LiCuPO_4$ and 25.94 g (1.0 mol) of LiF is made using a mortar and pestle, and pelletized. The mixture is placed inside a covered and sealed nickel crucible and transferred to a box oven. The mixture is heated rapidly (>50° C./min) to an ultimate temperature of about 600° C. and maintained at this temperature for about 15 minutes. The product is then cooled to ambient temperature.

EXAMPLE 6

An electrode active material comprising $Li_2Fe_{0.9}Mg_{0.1}PO_4F$, representative of the formula $A_{1+x}M'_{1-b}M''_bPO_4F_x$, is made as follows. First, a $LiFe_{0.9}Mg_{0.1}PO_4$ precursor is made according to the following reaction scheme.

$$0.50Li_2CO_3+0.45Fe_2O_3+0.10Mg(OH)_2+(NH_4)_2HPO_4+0.45C \rightarrow LiFe_{0.9}Mg_{0.1}PO_4+0.50CO_2+0.45CO+2.0NH_3+1.6H_2O$$

A mixture of 36.95 g (0.50 mol) of $Li_2CO_3$, 71.86 g (0.45 mol) of $Fe_2O_3$, 5.83 g (0.10 mol) of 0.10 $Mg(OH)_2$, 132.06 g (1.0 mol) of $(NH_4)_2HPO_4$, and 10.8 g (0.90 g-mol, 100% excess) of carbon is made, using a mortar and pestle. The mixture is pelletized, and transferred to a temperature-controlled tube furnace equipped with an argon gas flow. The mixture is heated at a ramp rate of about 2° C./minute to an ultimate temperature of about 750° C. in the inert atmosphere and maintained at this temperature for about 8 hours. The product is then cooled to ambient temperature (about 22° C.).

The $Li_{1+x}Fe_{0.9}Mg_{0.1}PO_4F_x$ is then made from the $LiFe_{0.9}Mg_{0.1}PO_4$ precursor, according to the following reaction scheme, where x equals 1.0.

$$LiFe_{0.9}Mg_{0.1}PO_4+LiF \rightarrow Li_2Fe_{0.9}Mg_{0.1}PO_4F$$

A mixture of 1.082 g $LiFe_{0.9}Mg_{0.1}PO_4$ and 0.181 g LiF is made using a mortar and pestle. The mixture is pelletized, placed in a covered and sealed nickel crucible, and transferred to a box oven in an inert (argon) atmosphere. The mixture is heated rapidly to an ultimate temperature of 700° C. in the inert atmosphere, and maintained at this temperature for about 15 minutes. The product is cooled to ambient temperature (about 21° C.).

EXAMPLE 7

An electrode active material of formula $Li_2Fe_{0.9}Mg_{0.1}PO_4F$, is made by the following alternative reaction scheme.

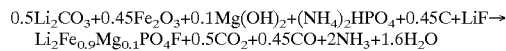

In this example, the product of Example 6 is made in a single step from starting materials that contain an alkali metal compound, two different metal sources, a phosphate compound and an alkali metal halide, exemplified by lithium fluoride. The starting materials in molar amounts as indicated in the equation are combined, mixed, and pelletized. The sample is heated in an oven at a ramp rate of 2° per minute to an ultimate temperature of 750° C. and maintained at this temperature for 8 hours. At this temperature, carbon monoxide is the material predominantly formed from the carbon.

EXAMPLE 8

An electrode active material comprising $Li_{1.25}Fe_{0.9}Mg_{0.1}PO_4F_{0.25}$ is made according to the following reaction scheme.

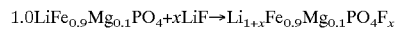

For x equal to 0.25, 1.082 grams of $LiFe_{0.9}Mg_{0.1}PO_4$ (made as in Example 6) and 0.044 grams of LiF are premixed and pelletized, transferred to an oven and heated to an ultimate temperature of 700° C. and maintained for 15 minutes at this temperature. The sample is cooled and removed from the oven. Almost no weight loss is recorded for the reaction, consistent with full incorporation of the lithium fluoride into the phosphate structure to make an active material of formula $Li_{1.25}Fe_{0.9}Mg_{0.1}PO_4F_{0.25}$.

EXAMPLE 9

An electrode active material comprising $Na_{1.2}VPO_4F_{1.2}$ is made as follows. In a first step, a metal phosphate is made by carbothermal reduction of a metal oxide, here exemplified by vanadium pentoxide. The overall reaction scheme of the carbothermal reduction is as follows.

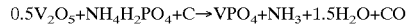

31.5 grams of $VPO_5$, 39.35 grams of $NH_4H_2PO_4$ and 4.5 grams of carbon (10% excess) are used. The precursors are premixed using a mortar and pestle and then pelletized. The pellet is transferred to an oven equipped with a flowing air atmosphere. The sample is heated at a ramp rate of 2° per minute to an ultimate temperature of 300° C. and maintained at this temperature for three hours. The sample is cooled to room temperature, removed from the oven, recovered, re-mixed and repelletized. The pellet is transferred to a furnace with an argon atmosphere. The sample is heated at a ramp rate of 2° per minute to an ultimate temperature 750° C. and maintained at this temperature for 8 hours.

In a second step, the vanadium phosphate made in the first step is reacted with an alkali metal halide, exemplified by sodium fluoride, according to the following reaction scheme.

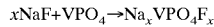

5.836 grams of $VPO_4$ and 1.679 grams of NaF are used. The precursors are pre-mixed using a mortar and pestle and then pelletized. The pellet is transferred to an oven equipped with a flowing argon atmosphere, the sample is heated at a ramp rate of 2° per minute to an ultimate temperature of 750° C. and maintained at this temperature for an hour. The sample is cooled and removed from the furnace.

To make $Na_{1.2}VPO_4F_{1.2}$, the reaction is repeated with a 20% mass excess of sodium fluoride over the previous reaction. The precursors are pre-mixed using a mortar and pestle and pelletized as before. The sample is heated to an ultimate temperature of 700° C. and if maintained at this temperature for 15 minutes. The sample is cooled and removed from the oven. There is only a small weight loss during reaction, indicating almost full incorporation of the NaF.

To make an active material of formula $Na_{1.5}VPO_4F_{1.5}$ the reaction is repeated with an approximate 50% mass excess of sodium fluoride over the first reaction. The sample is heated at 700° C. for 15 minutes, cooled, and removed from the oven.

EXAMPLE 10

Electrode active materials comprising compounds of the formula $Na_xCrPO_4F_x$, exemplifying the general formula $A_xMPO_4Z_x$, are made according to the following reaction scheme.

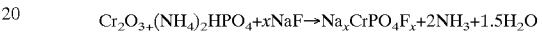

The starting materials are mixed using a mortar and pestle palletized, placed into an oven and heated to a temperature of 800° C. and maintained at this temperature for six hours.

EXAMPLE 11

An electrode active material comprising $NaMnPO_4F$ is made according to the following reaction scheme.

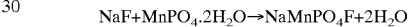

For this reaction, the $MnPO_4$ may be conveniently made from $Mn_2O_5$ by carbothermal reduction. 1.87 grams of $MnPO_4.2H_2O$ and 0.419 grams of NaF are mixed, pelletized, and heated in an oven up to an ultimate temperature of 500° C. and maintained for fifteen minutes.

EXAMPLE 12

An electrode active material comprising $NaCoPO_4F$ is made according to the following reaction scheme.

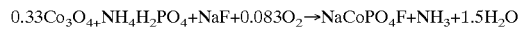

This active material is made under oxidizing conditions where the metal in the final product has a higher oxidation state than the metal in the starting material. 3 grams of $Co_3O_4$, 1.57 grams of NaF, and 4.31 grams of $NH_4H_2PO_4$ are mixed, pelletized, and heated to an ultimate temperature of 300° C. and maintained at the temperature for three hours. This sample is cooled, removed from the oven, repelletized, and returned to the oven where it is heated to an ultimate temperature of 800° C. and maintained at the temperature for eight hours.

EXAMPLE 13

An electrode active material comprising $Li_{0.1}Na_{0.9}VPO_4F$ is made according to the following reaction scheme.

As an alternative to using alkaline fluorides, a reaction between $VPO_4$ and $NH_4F$ and a mixture of $Li_2CO_3$ and $Na_2CO_3$ may also be used.

To make $Li_{0.1}Na_{0.9}VPO_4F$, 1.459 grams $VPO_4$, 0.026 grams of LiF, and 0.378 grams of NaF are premixed, pelletized, placed in an oven and heated to an ultimate temperature of 700° C. The temperature is maintained for fifty minutes after which the sample is cooled to room temperature and removed from the oven. To make $Li_{0.95}Na_{0.05}VPO_4F$, 1.459 grams of $VPO_4$, 0.246 grams of LiF, and 0.021 grams of NaF are mixed together and heated in an oven as in the previous step.

EXAMPLE 14

An electrode active material comprising $NaVPO_4F$ is made hydrothermally according to the following reaction scheme.

$$NaF + VPO_4 \rightarrow NaVPO_4F$$

1.49 grams of $VPO_4$ and 1.42 grams of NaF are premixed with approximately 20 milliliters of deionized water, transferred and sealed in a Parr Model 4744 acid digestion bomb, which is a Teflon lined stainless steel hydrothermal reaction vessel. The bomb is placed in an oven and heated at a ramp rate of 5° per minute to an ultimate temperature of 250° C. to create an internal pressure and maintained at this temperature for forty-eight hours. The sample is slowly cooled to room temperature and removed from the furnace for analysis. The product sample is washed repeatedly with deionized water to remove unreacted impurities. Then the sample is dried in an oven equipped with argon gas flow at 250° C. for one hour.

EXAMPLE 15

An electrode active material of formula $NaVPO_4OH$ is made according to the following alternative reaction scheme.

$$NaOH + VPO_4 \rightarrow NaVPO_4OH$$

In this Example, the reaction of the Example 14 is repeated, except that an appropriate molar amount of sodium hydroxide is used instead of sodium fluoride. The reaction is carried out hydrothermally as in Example 14. The hydroxyl group is incorporated into the active material at the relatively low temperature of reaction.

EXAMPLE 16

An electrode active material comprising $NaVPO_4F$ is made according to the following reaction scheme.

$$0.5Na_2CO_3 + NH_4F + VPO_4 \rightarrow NaVPO_4F + NH_3 + 0.5CO_2 + 0.5H_2O$$

1.23 grams of $VPO_4$, 0.31 grams of $NH_4F$, and 0.45 grams $Na_2CO_3$ are premixed with approximately 20 milliliters of deionized water and transferred and sealed in a Parr Model 4744 acid digestion bomb, which is a Teflon lined stainless steel reaction vessel. The bomb is placed in an oven and heated to an ultimate temperature of 250° C. and maintained at this temperature for forty-eight hours. The sample is cooled to room temperature and removed for analysis. The sample is washed repeatedly with the deionized water to remove unreacted impurities and thereafter is dried in an argon atmosphere at 250° C. for an hour.

EXAMPLE 17

An electrode active material comprising $Li_4Fe_2(PO_4)_3F$, representative of materials of the general formula $A^a M_b (PO_4)_3 Z_d$, is made according to the following reaction scheme.

$$2Li_2CO_3 + Fe_2O_3 + 3NH_4H_2(PO_4) + NH_4F \rightarrow Li_4Fe_2(PO_4)_3F + 2CO_2 + 4NH_3 + 5H_2O$$

Here, $M_2O_3$ represents a +3 metal oxide or mixture of +3 metal oxides. Instead of 2 lithium carbonates, a mixture of lithium sodium and potassium carbonates totaling two moles may be used to prepare an analogous compound having lithium, sodium and potassium as alkali metals. The starting material alkali metal carbonate, the metal or mixed metal +3 oxidation state oxides, the ammonium dihydrogen phosphate, and the ammonium fluoride are combined in stoichiometric ratios indicated in the form of powders, and the powders are mixed and pelletized as in the previous examples. The pellet is transferred to an oven and is heated up to an ultimate temperature of about 800° C. and maintained at that temperature for 8 hours. The reaction mixture is then cooled and removed from the oven.

EXAMPLE 18

An electrode active material comprising $Na_2Li_2M_2(PO_4)_3F$ is made according to the following reaction scheme.

$$Li_2CO_3 + Na_2CO_3 + 2MPO_4 + NH_4H_2PO_4 + NH_4F \rightarrow Na_2Li_2M_2(PO_4)_3F + 2CO_2 + 2NH_3 + 2H_2O$$

The starting materials are combined in the stoichiometric ratios indicated and are reacted according to the general procedure of Example 17. Here, $MPO_4$ represents a metal +3 phosphate or mixture of metal +3 phosphates.

EXAMPLE 19

An electrode active material comprising active material $Li_4V_2(PO_4)_3F$, representative of materials of the general formula $A_a M_b (PO_4)_3 Z_d$, is synthesized with carbothermal reduction according to the following reaction scheme. This reaction is based on conversion of carbon to carbon monoxide in the carbothermal reduction mechanism.

$$2C + 1.5Li_2CO_3 + V_2O_5 + LiF + 3NH_4H_2PO_4 \rightarrow Li_4V_2(PO_4)_3F + 1.5CO_2 + 3NH_3 + 4.5H_2O + 2CO$$

In the reaction scheme, carbon is supplied in excess so that the product formed is limited by the other starting materials present. The starting materials are combined, mixed, pelletized, and heated according to the process described above in Example 7.

EXAMPLE 20

An electrode active material comprising $Li_5Mn_2(PO_4)_3F_2$ is made according to the following reaction scheme.

$$2.5Li_2CO_3 + Mn_2O_3 + 3NH_4H_2PO_4 + 2NH_4F \rightarrow Li_5Mn_2(PO_4)_3F_2 + 2.5CO_2 + 5NH_3 + 5.5H_2O.$$

The starting materials are combined in stoichiometric ratios as indicated and reacted under conditions similar to that of Examples 17 and 18. This reaction represents the incorporation of a +4 oxidation state metal into an active material of the invention that contains three phosphates groups. The reaction is carried out without reduction.

EXAMPLE 21

An electrode active material comprising $Li_6V_2(PO_4)_3F$ is synthesized according to the equation $$3C + 2.5Li_2CO_3 + V_2O_5 + LiF + 3NH_4H_2PO_4 \rightarrow Li_6V_2(PO_4)_3F + 2.5CO_2 + 3NH_3 + 4.5H_2O + 3CO.$$

The equation presupposes that the carbothermal reaction proceeds with production of carbon monoxide. Here again, the carbon is provided in excess, in this case to reduce the vanadium +5 species all the way down to its lowest oxidation of +2. It is appreciated in the reaction scheme that such a reduction is possible because there is enough lithium in the reaction scheme that lithium is incorporated into the reaction product in an amount sufficient to neutralize the $(PO_4)_3F^{-10}$ group of the active material.

EXAMPLE 22

An electrode active material comprising $Li_{1.5}Na_{1.5}M_2(PO_4)_2(PO_3F)F$, where a phosphate group is partially substituted by a monofluoromonophosphate, is made as follows. This process is analogous to that described in Example 18, except that $LiHPO_3F$ is substituted for $NH_4H_2PO_4$. The active material is made by the following reaction scheme:

$$0.25Li_2CO_3 + 0.75Na_2CO_3 + 2MPO_4 + LiHPO_3F + NH_4F \rightarrow Li_{1.5}Na_{1.5}M_2(PO_4)_2(PO_3F)F + CO_2 + NH_3 + H_2O$$

The starting materials are provided in the molar ratios indicated. The powdered starting materials are mixed, pelletized, and placed in an oven at about 700° C. for 1–8 hours.

In an alternative embodiment, an extra mole of fluoride is provided so that the reaction occurs according to the scheme:

$$0.5Li_2CO_3 + Na_2CO_3 + 2MPO_4 + LiHPO_3F + 2NH_4F \rightarrow Li_2Na_2M_2(PO_4)_2(PO_3F)F_2 + CO_2 + 2NH_3 + 1.5H_2O$$

This example demonstrates both the partial replacement of phosphate by monofluoromonophosphate and the control of the reaction product by selection of the molar amounts of the starting materials.

EXAMPLE 23

An electrode active material comprising $Na_{0.2}LiCr(PO_4)_{0.8}(SiO_4)_{0.2}F$ is made according to the following reaction scheme.

$$0.1Na_2CO_3 + 0.5Cr_2O_3 + 0.8(NH_4)_2HPO_4 + LiF + 0.2SiO_2 \rightarrow Na_{0.2}LiCr(PO_4)_{0.8}(SiO_4)_{0.2}F + 0.1CO_2 + 1.6NH_3 + 1.2H_2O.$$

Powdered starting materials are provided in the molar amounts indicated, mixed, palletized, and placed in an oven. The sample is heated to an ultimate temperature of 750° C. and held there for four hours.

EXAMPLE 24

An electrode active material comprising $Li_4AlV(PO_4)_{2.5}(SbO_4)_{0.5}F$, representative of materials of the formula $A_nM1_y^{+3}M2_{2-y}^{+3}(PO_4)_z(SbO_4)_{3-z}F$ (wherein A=Li, n=4, M1=Al, M2=V, M3=Mg, y=1, and z=2.5,) are made according to the following reaction scheme.

$$2Li_2CO_3 + 0.5Al_2O_3 + VPO_4 + 0.25Sb_2O_5 + 1.5NH H_2PO_4 + NH_4F \rightarrow Li_4AlV(PO_4)_{2.5}(SbO_4)_{0.5}F + 2CO_2 + 2.5NH_3 + 2.75H_2O$$

Powdered starting materials are provided in the molar amounts indicated, mixed, pelletized, and placed in an oven. The sample is heated to an ultimate temperature of 750° C. and held there for four hours.

EXAMPLE 25

An electrode active material comprising $Li_{2.025}Co_{0.9}Al_{0.025}Mg_{0.05}PO_4F$ is made as follows. (This Example shows the synthesis of a mixed metal active material containing lithium and three different metals, with two metals in a +2 and one metal in a +3 oxidation state). For A=Li, a=2.025, M1=Co, M2=Al, and M3=Mg, the reaction proceeds according to the following scheme.

$$0.5125Li_2CO_3 + 0.3Co_3(PO_4)_2 \cdot 8H_2O + 0.0125Al_2O_3 + 0.05Mg(OH)_2 + LiF + 0.4NH_4H_2PO_4 \rightarrow Li_{2.025}Co_{0.9}Al_{0.025}Mg_{0.05}PO_4F + 0.5125CO_2 + 0.4NH_3 + 8.9H_2O.$$

Powdered starting materials are provided in the molar ratios indicated, mixed, pelletized, and heated in an oven at 750° C. for four hours to produce a reaction product.

The examples and other embodiments described herein are exemplary and not intended to be limiting in describing the full scope of compositions and methods of this invention. Equivalent changes, modifications and variations of specific embodiments, materials, compositions and methods may be made within the scope of the present invention, with substantially similar results.

What is claimed is:

1. An electrode active material represented by the general formula:

$$A_aM_b(PO_4)_{3-x}(SiO_4)_xZ_d,$$

wherein,
(a) A is selected from the group consisting of Li, Na, K, and mixtures thereof, and $0 < a \leq 8$;
(b) M comprises one or more metals, wherein at least one of the one or more metals is capable of undergoing oxidation to a higher valence state, and $1 \leq b \leq 3$;
(c) $0 < x < 3$; and
(d) Z is selected from the group consisting of a hydroxyl, a halogen, and mixtures thereof, and 0 6;
wherein A, M, Z, a, b, x and d are selected so as to maintain electroneutrality of the electrode active material.

2. The electrode active material according to claim 1, wherein A is Li.

3. The electrode active material according to claim 1, wherein a=3+2x+d.

4. The electrode active material according to claim 1, wherein a is 0.1 to about 6.

5. The electrode active material according to claim 1, wherein a is from about 2 to about 6.

6. The electrode active material according to claim 1, wherein a is from about 3 to about 6.

7. The electrode active material according to claim 1, wherein M comprises a transition metal selected from Groups 4 to 11 of the Periodic Table.

8. The electrode active material according to claim 7, wherein M is a +3 oxidation state transition metal selected from Groups 4 to 11 of the Periodic Table.

9. The electrode active material according to claim 7, wherein M is selected from the group consisting of Fe, Co, Ni, Mn, Cu, V, Zr, Ti, Cr, and mixtures thereof.

10. The electrode active material according to claim 1, wherein M is M'M", wherein M' is at least one transition metal selected from Groups 4 to 11 of the Periodic Table; and M" is at least one element selected from Groups 2, 3, 12, 13, and 14 of the Periodic Table.

11. The electrode active material according to claim 10, wherein M' is selected from the group consisting of Fe, Co, Ni, Mn, Cu, V, Zr, Ti, Cr, and mixtures thereof.

12. The electrode active material according to claim 11, wherein M' is selected from the group consisting of Fe, Co, Mn, Cu, V, Cr, and mixtures thereof.

13. The electrode active material according to claim 11, wherein M" is selected from the group consisting of Mg, Ca, Zn, Sr, Pb, Cd, Sn, Ba, Be, Al, and mixtures thereof.

14. The electrode active material according to claim 11, wherein M" is selected from the group consisting of Mg, Ca, Zn, Ba, Al, and mixtures thereof.

15. The electrode active material according to claim 10, wherein M" is selected from the group consisting of Mg, Ca, Zn, Sr, Pb, Cd, Sn, Ba, Be, Al, and mixtures thereof.

16. The electrode active material according to claim 1, wherein Z comprises F.

17. The electrode active material according to claim 1, wherein Z is selected from the group consisting of OH, F, Cl, Br, and mixtures thereof.

18. The electrode active material according to claim 1, wherein d is from 0.1 to about 6.

19. The electrode active material according to claim 1, wherein d is from about 2 to about 6.

20. The electrode active material according to claim 1, wherein d is from about 3 to about 6.

21. A battery, comprising:
a first electrode comprising electrode active material represented by the general formula:

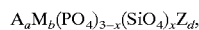

$$A_aM_b(PO_4)_{3-x}(SiO_4)_xZ_d,$$

wherein,
(a) A is selected from the group consisting of Li, Na, K, and mixtures thereof, and $0<a\leq 8$;
(b) M comprises one or more metals, wherein at least one of the one or more metals is capable of undergoing oxidation to a higher valence state, and $1\leq b\leq 3$;
(c) $0<a<3$; and
(d) Z is selected from the group consisting of a hydroxyl, a halogen, and mixtures thereof, and $0<d<6$; wherein A, M, Z, a, b, x and d are selected so as to maintain electroneutrality of the electrode active material, the battery further comprising a second electrode which is a counter-electrode to the first electrode; and
an electrolyte.

22. The battery according to claim 21, wherein A is Li.

23. The battery according to claim 21, wherein a=3+2x+d.

24. The battery according to claim 21, wherein a is 0.1 to about 6.

25. The battery according to claim 21, wherein a is from about 2 to about 6.

26. The battery according to claim 21, wherein a is from about 3 to about 6.

27. The battery according to claim 21, wherein M comprises a transition metal selected from Groups 4 to 11 of the Periodic Table.

28. The battery according to claim 27, wherein M is a +3 oxidation state transition metal selected from Groups 4 to 11 of the Periodic Table.

29. The battery according to claim 27, wherein M is selected from the group consisting of Fe, Co, Ni, Mn, Cu, V, Zr, Ti, Cr, and mixtures thereof.

30. The battery according to claim 21, wherein M is M'M", wherein M' is at least one transition metal selected from Groups 4 to 11 of the Periodic Table; and M" is at least one element selected from Groups 2, 3, 12, 13, and 14 of the Periodic Table.

31. The battery according to claim 30, wherein M' is selected from the group consisting of Fe, Co, Ni, Mn, Cu, V, Zr, Ti, Cr, and mixtures thereof.

32. The battery according to claim 31, wherein M' is selected from the group consisting of Fe, Co, Mn, Cu, V, Cr, and mixtures thereof.

33. The battery according to claim 31, wherein M" is selected from the group consisting of Mg, Ca, Zn, Sr, Pb, Cd, Sn, Ba, Be, Al, and mixtures thereof.

34. The battery according to claim 33, wherein M" is selected from the group consisting of Mg, Ca, Zn, Ba, Al, and mixtures thereof.

35. The battery according to claim 30, wherein M" is selected from the group consisting of Mg, Ca, Zn, Sr, Pb, Cd, Sn, Ba, Be, Al, and mixtures thereof.

36. The battery according to claim 21, wherein Z comprises F.

37. The battery according to claim 21, wherein Z is selected from the group consisting of OH, F, Cl, Br, and mixtures thereof.

38. The battery according to claim 21, wherein d is from 0.1 to about 6.

39. The battery according to claim 21, wherein d is from about 2 to about 6.

40. The battery according to claim 21, wherein d is from about 3 to about 6.

41. The battery according to claim 21, wherein the second electrode comprises a material selected from the group consisting of a metal oxide, metal chalcogenide, carbon, graphite, and mixtures thereof.

42. The battery according to claim 41, wherein the electrolyte comprises a solvent selected from the group consisting of dimethyl carbonate, diethyl carbonate, dipropylcarbonate, ethyl methyl carbonate, butylene carbonate, γ-butyrolactone, triglyme, tetraglyme, a lactone, an ester, dimethylsulfoxide, dioxolane, sulfolane, and mixtures thereof.

43. The battery according to claim 42, wherein the electrolyte further comprises a lithium salt selected from the group consisting of $LiAsF_6$, $LiPF_6$, $LiClO_4$, $LiB(C_6H_5)_4$, $LiAlCl_4$, LiBr, and mixtures thereof.

44. An electrode active material represented by the general formula:

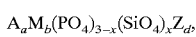

$$A_aM_b(PO_4)_{3-x}(SiO_4)_xZ_d,$$

wherein,
(a) A is selected from the group consisting of Li, Na, K, and mixtures thereof, and $0<a\leq 8$;
(b) M comprises two or more transition metals selected from Groups 4 through 11 of the Periodic Table, and $1\leq b\leq 3$;
(c) $0\leq x\leq 3$; and
(d) Z is selected from the group consisting of a hydroxyl, a halogen, and mixtures thereof, and $0<d\leq 6$;
wherein A, M, Z, a, b, x and d are selected so as to maintain electroneutrality of the electrode active material.

45. The electrode active material according to claim 44, wherein A is Li.

46. The electrode active material according to claim 44, wherein a is 0.1 to about 6.

47. The electrode active material according to claim 44, wherein a is from about 2 to about 6.

48. The electrode active material according to claim 44, wherein a is from about 3 to about 6.

49. The electrode active material according to claim 44, wherein M consists of two transition metals selected from Groups 4 through 11 of the Periodic Table.

50. The electrode active material according to claim 49, wherein M is consists of two transition metals selected from the group consisting of Ti, V, Cr, Mn, Fe, Go, Ni, Cu, and mixtures thereof.

51. The electrode active material according to claim 44, wherein M comprises two or more transition metals selected from the group consisting of Ti, V, Cr, Mn, Fe, Go, Ni, Cu, and mixtures thereof.

52. The electrode active material according to claim 44, wherein 0<x<3.

53. The electrode active material according to claim 44, wherein x=0.

54. The electrode active material according to claim 44, wherein x=3.

55. The electrode active material according to claim 44, wherein Z comprises F.

56. The electrode active material according to claim 44, wherein Z is selected from the group consisting of OH, F, Cl, Br, and mixtures thereof.

57. The electrode active material according to claim 44, wherein d is from 0.1 to about 6.

58. The electrode active material according to claim 44, wherein d is from about 2 to about 6.

59. The electrode active material according to claim 44, wherein d is from about 3 to about 6.

60. A battery, comprising:
a first electrode comprising an electrode active material represented by the general formula:

$A_aM_b(PO_4)_{3-x}(SiO_4)_xZ_d$, wherein,
(a) A is selected from the group consisting of Li, Na, K, and mixtures thereof, and $0<a\leq 8$;
(b) M comprises two or more transition metals selected from Groups 4 through 11 of the Periodic Table, and $1\leq b\leq 3$;
(c) $0\leq x\leq 3$; and
(d) Z is selected from the group consisting of a hydroxyl, a halogen, and mixtures thereof, and $0<d<6$; wherein A, M, Z, a, b, x and d are selected so as to maintain electroneutrality of the battery;
the battery further comprising a second electrode which is a counter-electrode to the first electrode; and
an electrolyte.

61. The battery according to claim 60, wherein A is Li.

62. The battery according to claim 60, wherein a is 0.1 to about 6.

63. The battery according to claim 60, wherein a is from about 2 to about 6.

64. The battery according to claim 60, wherein a is from about 3 to about 6.

65. The battery according to claim 60, wherein M consists of two transition metals selected from Groups 4 through 11 of the Periodic Table.

66. The battery according to claim 65, wherein M is consists of two transition metals selected from the group consisting of Ti, V, Cr, Mn, Fe, Co, Ni, Cu, and mixtures thereof.

67. The battery according to claim 60, wherein M comprises two or more transition metals selected from the group consisting of Ti, V, Cr, Mn, Fe, Co, Ni, Cu, and mixtures thereof.

68. The battery according to claim 67, wherein M comprises two or more transition metals selected from the group consisting of Fe, Co, Mn, Cu, V, Cr, and mixtures thereof.

69. The battery according to claim 60, wherein 0<x<3.

70. The battery according to claim 60, wherein x=0.

71. The battery according to claim 60, wherein x=3.

72. The battery according to claim 60, wherein Z comprises F.

73. The battery according to claim 60, wherein Z is selected from the group consisting of OH, F, Cl, Br, and mixtures thereof.

74. The battery according to claim 60, wherein d is from 0.1 to about 6.

75. The battery according to claim 60, wherein d is from about 2 to about 6.

76. The battery according to claim 60, wherein d is from about 3 to about 6.

77. The battery according to claim 60, wherein the second electrode comprises a material selected from the group consisting of a metal oxide, metal chalcogenide, carbon, graphite, and mixtures thereof.

78. The battery according to claim 77, wherein the electrolyte comprises a solvent selected from the group consisting of dimethyl carbonate, diethyl carbonate, dipropylcarbonate, ethyl methyl carbonate, butylene carbonate, γ-butyrolactone, triglyme, tetraglyme, a lactone, an ester, dimethylsulfoxide, dioxolane, sulfolane, and mixtures thereof.

79. The battery according to claim 78, wherein the electrolyte further comprises a lithium salt selected from the group consisting of $LiAsF_6$, $LiPF_6$, $LiClO_4$, $LiB(C_6H_5)_4$, $LiAlCl_4$, LiBr, and mixtures thereof.

80. A battery, comprising:
a first electrode comprising an electrode active material represented by the general formula:

$A_aM_b(PO_4)_{3-x}(SiO_4)_xZ_d$, wherein,
(a) A is selected from the group consisting of Li, Na, K, and mixtures thereof, $0<a\leq 8$;
(b) M comprises M'M", wherein M' is at least one transition metal selected from Groups 4 through 11 of the Periodic Table; and M" is at least one element selected from Groups 2, 3, 12, 13, and 14 of the Periodic Table, and $1\leq b\leq 3$;
(c) $0\leq x\leq 3$; and
(d) Z is selected from the group consisting of a hydroxyl, a halogen, and mixtures thereof, and $0<d\leq 6$; wherein A, M, Z, a, b, x and d are selected so as to maintain electroneutrality of the electrode active material;
the battery further comprising a second electrode which is a counter-electrode to the first electrode; and
an electrolyte.

81. The battery according to claim 80, wherein A is Li.

82. The battery according to claim 80, wherein a is 0.1 to about 6.

83. The battery according to claim 80, wherein a is from about 2 to about 6.

84. The battery according to claim 80, wherein a is from about 3 to about 6.

85. The battery according to claim 80, wherein M' is selected from the group consisting of Fe, Co, Ni, Mn, Cu, V, Zr, Ti, Cr, and mixtures thereof.

86. The battery according to claim 85, wherein M' is selected from the group consisting of Fe, Co, Mn, Cu, V, Cr, and mixtures thereof.

87. The battery according to claim 85, wherein M" is selected from the group consisting of Mg, Ca, Zn, Sr, Pb, Cd, Sn, Ba, Be, Al, and mixtures thereof.

88. The battery according to claim 87, wherein M" is selected from the group consisting of Mg, Ca, Zn, Ba, Al, and mixtures thereof.

89. The battery according to claim 80, wherein M" is selected from the group consisting of Mg, Ca, Zn, Sr, Pb, Cd, Sn, Ba, Be, Al, and mixtures thereof.

90. The battery according to claim 80, wherein M consists of M'M", wherein M' is at least one transition metal selected from Groups 4 through 11 of the Periodic Table; and M" is at least one element selected from Groups 2, 3, 12, 13, and 14 of the Periodic Table.

91. The battery according to claim 90, wherein M' is selected from the group consisting of Fe, Co, Ni, Mn, Cu, V, Zr, Ti, Cr, and mixtures thereof.

92. The battery according to claim 91, wherein M' is selected from the group consisting of Fe, Co, Mn, Cu, V, Cr, and mixtures thereof.

93. The battery according to claim 91, wherein M" is selected from the group consisting of Mg, Ca, Zn, Sr, Pb, Cd, Sn, Ba, Be, Al, and mixtures thereof.

94. The battery according to claim 93, wherein M" is selected from the group consisting of Mg, Ca, Zn, Ba, Al, and mixtures thereof.

95. The battery according to claim 90, wherein M" is selected from the group consisting of Mg, Ca, Zn, Sr, Pb, Cd, Sn, Ba, Be, Al, and mixtures thereof.

96. The battery according to claim 80, wherein 0<x<3.

97. The battery according to claim 80, wherein x=0.

98. The battery according to claim 80, wherein x=3.

99. The battery according to claim 80, wherein Z comprises F.

100. The battery according to claim 80, wherein Z is selected from the group consisting of OH, F, Cl, Br, and mixtures thereof.

101. The battery according to claim 80, wherein d is from 0.1 to about 6.

102. The battery according to claim 80, wherein d is from about 2 to about 6.

103. The battery according to claim 80, wherein d is from about 3 to about 6.

104. The battery according to claim 80, wherein the second electrode comprises a material selected from the group consisting of a metal oxide, metal chalcogenide, carbon, graphite, and mixtures thereof.

105. The battery according to claim 104, wherein the electrolyte comprises a solvent selected from the group consisting of dimethyl carbonate, diethyl carbonate, dipropylcarbonate, ethyl methyl carbonate, butylene carbonate, γ-butyrolactone, triglyme, tetraglyme, a lactone, an ester, dimethylsulfoxide, dioxolane, sulfolane, and mixtures thereof.

106. The battery according to claim 105, wherein the electrolyte further comprises a lithium salt selected from the group consisting of $LiAsF_6$, $LiPF_6$, $LiClO_4$, $LiB(C_6H_5)_4$, $LiAlCl_4$, LiBr, and mixtures thereof.

107. An electrode active material represented by the general formula:

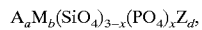

$$A_aM_b(SiO_4)_{3-x}(PO_4)_xZ_d,$$

wherein,
(a) A is selected from the group consisting of Li, Na, K, and mixtures thereof, $0<a\leq 8$, and $a=3+2x+d$;
(b) M comprises one or more metals, wherein at least one of the one or more metals is capable of undergoing oxidation to a higher valence state, and $1\leq b\leq 3$;
(c) $0\leq x\leq 3$; and
(d) Z is selected from the group consisting of a hydroxyl, a halogen, and mixtures thereof, and $0<d\leq 6$; wherein A, M, Z, a, b, x and d are selected so as to maintain electroneutrality of the electrode active material.

108. The electrode active material according to claim 107, wherein A is Li.

109. The electrode active material according to claim 107, wherein a is 0.1 to about 6.

110. The electrode active material according to claim 107, wherein a is from about 2 to about 6.

111. The electrode active material according to claim 107, wherein a is from about 3 to about 6.

112. The electrode active material according to claim 107, wherein M comprises two or more transition metals selected from the group consisting of Ti, V, Cr, Mn, Fe, Go, Ni, Cu, and mixtures thereof.

113. The electrode active material according to claim 107, wherein M is M'M", wherein M' is at least one transition metal selected from Groups 4 through 11 of the Periodic Table; and M" is at least one element selected from Groups 2, 3, 12, 13, and 14 of the Periodic Table.

114. The electrode active material according to claim 113, wherein M' is selected from the group consisting of Fe, Co, Ni, Mn, Cu, V, Zr, Ti, Cr, and mixtures thereof.

115. The electrode active material according to claim 114, wherein M' is selected from the group consisting of Fe, Co, Mn, Cu, V, Cr, and mixtures thereof.

116. The electrode active material according to claim 114, wherein M" is selected from the group consisting of Mg, Ca, Zn, Sr, Pb, Cd, Sn, Ba, Be, Al, and mixtures thereof.

117. The electrode active material according to claim 116, wherein M" is selected from the group consisting of Mg, Ca, Zn, Ba, Al, and mixtures thereof.

118. The electrode active material according to claim 113, wherein M" is selected from the group consisting of Mg, Ca, Zn, Sr, Pb, Cd, Sn, Ba, Be, Al, and mixtures thereof.

119. The electrode active material according to claim 107, wherein 0<x<3.

120. The electrode active material according to claim 107, wherein x=0.

121. The electrode active material according to claim 107, wherein x=3.

122. The electrode active material according to claim 107, wherein Z comprises F.

123. The electrode active material according to claim 107, wherein Z is selected from the group consisting of OH, F, Cl, Br, and mixtures thereof.

124. The electrode active material according to claim 107, wherein d is from 0.1 to about 6.

125. The electrode active material according to claim 107, wherein d is from about 2 to about 6.

126. The electrode active material according to claim 107, wherein d is from about 3 to about 6.

127. A battery, comprising:
a first electrode comprising an electrode active material represented by the general formula:

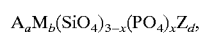

$$A_aM_b(SiO_4)_{3-x}(PO_4)_xZ_d,$$

wherein,
(a) A is selected from the group consisting of Li, Na, K, and mixtures thereof, $0<a\leq 8$, and $a=3+2x+d$;
(b) M comprises one or more metals, wherein at least one of the one or more metals is capable of undergoing oxidation to a higher valence state, and $1\leq b\leq 3$;
(c) $0\leq x\leq 3$; and
(d) Z is selected from the group consisting of a hydroxyl, a halogen, and mixtures thereof, and $0<d\leq 6$; wherein A, M, Z, a, b, x and d are selected so as to maintain electroneutrality of the electrode active material;
the battery further comprising a second electrode which is a counter-electrode to the first electrode; and
an electrolyte.

128. The battery according to claim 127, wherein A is Li.

129. The battery according to claim 127, wherein a is 0.1 to about 6.

130. The battery according to claim 127, wherein a is from about 2 to about 6.

131. The battery according to claim 127, wherein a is from about 3 to about 6.

132. The battery according to claim 127, wherein M comprises two or more transition metals selected from the group consisting of Ti, V, Cr, Mn, Fe, Co, Ni, Cu, and mixtures thereof.

133. The battery according to claim 127, wherein M is M'M", wherein M' is at least one transition metal selected from Groups 4 through 11 of the Periodic Table; and M" is at least one element selected from Groups 2, 3, 12, 13, and 14 of the Periodic Table.

134. The battery according to claim 133, wherein M' is selected from the group consisting of Fe, Co, Ni, Mn, Cu, V, Zr, Ti, Cr, and mixtures thereof.

135. The battery according to claim 134, wherein M' is selected from the group consisting of Fe, Co, Mn, Cu, V, Cr, and mixtures thereof.

136. The battery according to claim 134, wherein M" is selected from the group consisting of Mg, Ca, Zn, Sr, Pb, Cd, Sn, Ba, Be, Al, and mixtures thereof.

137. The battery according to claim 136, wherein M" is selected from the group consisting of Mg, Ca, Zn, Ba, Al, and mixtures thereof.

138. The battery according to claim 133, wherein M" is selected from the group consisting of Mg, Ca, Zn, Sr, Pb, Cd, Sn, Ba, Be, Al, and mixtures thereof.

139. The battery according to claim 127, wherein $0<x<3$.

140. The battery according to claim 127, wherein $x=0$.

141. The battery according to claim 127, wherein $x=3$.

142. The battery according to claim 127, wherein Z comprises F.

143. The battery according to claim 127, wherein Z is selected from the group consisting of OH, F, Cl, Br, and mixtures thereof.

144. The battery according to claim 127, wherein d is from 0.1 to about 6.

145. The battery according to claim 127, wherein d is from about 2 to about 6.

146. The battery according to claim 127, wherein d is from about 3 to about 6.

147. The battery according to claim 127, wherein $b=2$ and the second electrode comprises a material selected from the group consisting of a metal oxide, metal chalcogenide, carbon, graphite, and mixtures thereof.

148. The battery according to claim 147, wherein the electrolyte comprises a solvent selected from the group consisting of dimethyl carbonate, diethyl carbonate, dipropylcarbonate, ethyl methyl carbonate, butylene carbonate, γ-butyrolactone, triglyme, tetraglyme, a lactone, an ester, dimethylsulfoxide, dioxolane, sulfolane, and mixtures thereof.

149. The battery according to claim 148, wherein the electrolyte further comprises a lithium salt selected from the group consisting of $LiAsF_6$, $LiPF_6$, $LiClO_4$, $LiB(C_6H_5)_4$, $LiAlCl_4$, LiBr, and mixtures thereof.

* * * * *

UNITED STATES PATENT AND TRADEMARK OFFICE
CERTIFICATE OF CORRECTION

PATENT NO. : 6,777,132 B2
DATED : August 17, 2004
INVENTOR(S) : Jeremy Barker, Yazid Saidi and Jeffrey L. Swoyer It is certified that error appears in the above-identified patent and that said Letters Patent is hereby corrected as shown below:

Column 32,
Line 31, delete "0 6," and insert -- $0 < d \leq 6$ -- there for.

Column 33,
Line 19, insert -- an -- after "comprising".
Line 31, delete "a < 3" and insert -- $x < 3$ -- there for.
Line 34, delete "d < 6" and insert -- $d \leq 6$ -- there for.

Column 34,
Line 66, delete "Go" and insert -- Co -- there for.

Column 35,
Line 3, delete "Go" and insert -- Co -- there for.
Line 52, delete "is".

Column 38,
Line 9, delete "Go" and insert -- Co -- there for.

Signed and Sealed this

Thirtieth Day of November, 2004

JON W. DUDAS
*Director of the United States Patent and Trademark Office*